(12) United States Patent
Ohnishi et al.

(10) Patent No.: US 6,545,376 B2
(45) Date of Patent: Apr. 8, 2003

(54) THREE-PHASE HYBRID TYPE STEPPING MOTOR

(75) Inventors: Kazuo Ohnishi, Gunma (JP); Masafumi Sakamoto, Gunma (JP); Koki Isozaki, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/861,913

(22) Filed: May 21, 2001

(65) Prior Publication Data

US 2002/0079749 A1 Jun. 27, 2002

(30) Foreign Application Priority Data

| May 23, 2000 | (JP) | 2000-151154 |
| Aug. 9, 2000 | (JP) | 2000-240691 |
| Mar. 27, 2001 | (JP) | 2001-089856 |

(51) Int. Cl.[7] .............................................. H02K 37/00
(52) U.S. Cl. .................... 310/49 R; 310/67 R; 310/254
(58) Field of Search .............................. 310/49 R, 254, 310/67 R, 261

(56) References Cited

U.S. PATENT DOCUMENTS

| 4,112,319 | A | * | 9/1978 | Field ........................ 310/49 R |
| 4,385,250 | A | * | 5/1983 | Welburn ..................... 310/162 |
| 4,516,048 | A | * | 5/1985 | Brigham ................ 310/156.64 |
| 5,128,570 | A | * | 7/1992 | Isozaki ....................... 310/180 |
| 5,410,200 | A | * | 4/1995 | Sakamoto et al. ........ 310/49 R |
| 5,708,310 | A |   | 1/1998 | Sakamoto et al. ............ 310/49 |

* cited by examiner

*Primary Examiner*—Burton S. Mullins
(74) *Attorney, Agent, or Firm*—Patterson, Thuente, Skaar & Christensen, LLC

(57) ABSTRACT

In the three-phase hybrid type stepping motor according to the present invention, the small stator teeth formed on the tip end of the stator pole are classified to sets of two or three small teeth, the third harmonic vector sum of the permeances of the small teeth in each set is determine to substantially zero, and the third, fifth and sixth harmonic vector sum of the permeances of the small teeth of the sets is determine to substantially zero, under the consideration that the permeances between the small teeth of the stator magnetic pole and the rotor are varied according to the rotation of the rotor and that the permeances are varied regularly.

20 Claims, 18 Drawing Sheets

PRIOR ART

PRIOR ART

(a) $0 \leq x < |\alpha - \beta| T$ $(\alpha \geq \beta)$ (a) $\alpha + \beta \leq 1$ (b) $\alpha + \beta > 1$

THREE-PHASE HYBRID TYPE STEPPING MOTOR

BACKGROUND OF THE INVENTION

1. Field of the Invention

The present invention relates to a three-phase hybrid type stepping motor, and more particularly to a three-phase hybrid type stepping motor having a structure capable of reducing cogging torque and improving a torque waveform.

2. Description of the Prior Art

A conventionally implemented three-phase hybrid type stepping motor has twelve magnetic poles with windings as shown in FIGS. 1A, 1B and 1C or six magnetic poles with windings as shown in FIGS. 2A, 2B and 2C.

The conventionally implemented three-phase hybrid type stepping motor shown in FIGS. 1A, 1B and 1C is composed of a stator having twelve magnetic poles 2 arranged on the inner periphery of an annular yoke 1 at equal intervals, windings 3 wound around the respective magnetic poles 2 to form three-phase windings and multiple small teeth 4 provided at the tip end of each magnetic pole 2, and a rotor 9 having two split rotor elements 7, a permanent magnet 8 held therebetween and magnetized to two polarities of N and S in an axial direction, and fifty small teeth 6 formed on an outer periphery of each of the rotor elements 7 at a regular pitch, said rotor elements 7 being shifted from each other in angular position by a ½ pitch of the teeth 6. The three-phase hybrid type stepping motor rotatably supports the rotor 9, the rotor 9 being opposed to the stator 5 with a gap therebetween.

On the contrary thereto, in the three-phase hybrid type stepping motor shown in FIGS. 2A, 2B and 2C, each of the rotor elements 7 has forty small teeth 6.

In the above-described three-phase hybrid type stepping motor, torque is generated between the rotor and the stator when the rotor is rotated without energizing the windings, and this torque is referred to as cogging torque.

A vernier method for unequalizing a pitch of the small teeth of the stator and that of the small teeth of the rotor was examined in order to reduce the cogging torque of the three-phase hybrid type stepping motor in the prior art. The examination is still insufficient and the satisfactory effect is not obtained. Therefore, it is an object of the present invention to elucidate the theory of the vernier method and obtain the effective vernier method having a high degree of freedom.

In the three-phase hybrid type stepping motor having twelve magnetic poles with windings shown in FIGS. 1A, 1B and 1C, a magnetic flux passing through one phase winding is not interlinked with a magnetic flux passing through the other phase winding. On the contrary, in the three-phase hybrid type stepping motor having six magnetic poles with windings shown in FIGS. 2A, 2B and 2C, a magnetic flux passing through one phase winding is interlinked with a magnetic flux passing through the other phase winding, and the quantity of the magnetic flux becomes twice that in the motor having the twelve magnetic poles, so that the torque becomes larger, and the electromagnetic energy can be absorbed and controlled easily because a relative inductance exists between the phases as a normal motor.

As shown in FIGS. 2A, 2B and 2C, the windings 3 of the magnetic poles facing each other and separated by 180° from each other are connected in series. The small teeth 6 of the N and S side rotor elements 7 are shifted from each other by 180° so that the top of small tooth of N side rotor element 7 is faced to the bottom of small tooth of S side rotor element 7.

Taking an equivalent circuit of a magnetic circuit of the hybrid type twelve magnetic poles three-phase stepping motor shown in FIGS. 1A to 1C into consideration, the equivalent circuit is as shown in FIG. 3A when the magnetic resistance in a magnet core is ignored for the sake of simplicity. In FIG. 3A, reference characters $F_u$, $F_v$, $F_w$, denote magnetomotive forces of V, W phases winding poles (that is, stator poles with windings); $P_i$ (here i is 1 to 6), a permeance of the i-th winding pole on the N polarity side; and $F_m$ and $P_m$, magnetomotive force and an internal permeance of the magnet. It should be noted that the permeances of the winding poles provided at axisymmetric positions are equal to each other and the same reference character is therefore used. Further, in regard to the windings at the axisymmetric positions are connected in series in the forward direction and are connected in series in the backward direction, respectively, the directions of the magnetomotive force to these poles are shown in the Figure. As shown in FIG. 3A, the same four circuit groups (sub circuits) are aligned in parallel, thereby equivalently replacing with one sub circuit by the circuit logic. This is shown in FIG. 4A. In this case, a number of the equivalent winding poles is six in the three-phase motor.

SUMMARY OF THE INVENTION

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an even number of and at least four small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of sets of two small stator teeth of the same width, and at least one pitch of the adjacent teeth is different from the other pitch of the other adjacent teeth, so that a vector sum of the tertiary or sixth harmonic of permeances of the small stator teeth included in each of said sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an odd number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of a first set of three small stator teeth including a small teeth positioned at the center of the stator pole and a second set of two small stator teeth of the same width, and at least one pitch of the adjacent teeth is different from the other pitch of the other adjacent teeth, so that a vector sum of the tertiary harmonic of permeances of the small stator teeth included in said first and said second sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an even number of and at least four small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of sets of two small stator teeth of the same width, and at least one pitch of the adjacent teeth is different from the other pitch of the other adjacent teeth, so that a vector sum of the tertiary or sixth harmonic of permeances of the small stator teeth included in each of said sets becomes substantially zero, and that a total sum in the fifth or tertiary harmonic space of a composite vector of permeances between said sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an odd number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of a first set of three small stator teeth of the same pitch including a small teeth positioned at the center of the stator pole and a second set of two small stator teeth of the same width, and at least one pitch of the adjacent teeth is different from the other pitch of the other adjacent teeth, so that a vector sum of the tertiary or sixth harmonic of permeances of the small stator teeth included in said first and said second sets becomes substantially zero, and that a total sum in the fifth or tertiary harmonic space of permeances between said first and second sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of a first set of three small stator teeth of the same width and the same pitch including a small teeth positioned at the center of the stator pole and second sets of two small stator teeth of the same width, and at least one pitch of the adjacent teeth is different from the other pitch of the other adjacent teeth, so that a vector sum of the tertiary harmonic of permeances of the small stator teeth included in said first and said second sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of a first set of two small stator teeth of the same width including a small teeth of the different width positioned at the center of the stator pole and second sets of two small stator teeth of the same width, and at least one pitch of the adjacent teeth is different from the other pitch of the other adjacent teeth, so that a vector sum of the tertiary harmonic of permeances of the small stator teeth included in said first and said second sets becomes substantially zero, and that a total sum in the fifth harmonic space of permeances between said first and second sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an even number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of a first set of three small stator teeth of the same pitch including a small teeth positioned at the center of the stator pole and a second set of two small stator teeth of the same width, and at least one pitch of the adjacent teeth is different from the other pitch of the other adjacent teeth, so that a vector sum of the sixth harmonic of permeances of the small stator teeth included in said first and said second sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of at least three sets of two small stator teeth, and at least one pitch of the adjacent teeth is different from the other pitch of the other adjacent teeth, so that a permeance vector sum on the sixth or third harmonic plane of permeances of the two small stator teeth included in each of said sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of at least two sets of three small stator teeth, and at least one pitch of the adjacent teeth is different from the other pitch of the other adjacent teeth, so that a permeances vector sum on the sixth or third harmonic plane of permeances of the three small stator teeth included in each of said sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of at least two sets of three small stator teeth and at least one pitch of the adjacent teeth is different from the other pitch of the other adjacent teeth, so that a permeance vector sum on the third or sixth harmonic plane of permeance of the three small stator teeth included in each of said sets becomes substantially zero, and that a permeance vector sum on the sixth or third harmonic plane of the small teeth included in each of said sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of at least two sets of three small stator teeth and at least one pitch of the adjacent teeth is different from the other pitch of the other adjacent teeth, so that a permeance vector sum on the third or fifth harmonic plane of permeances of the three small stator teeth included in each of said sets becomes substantially zero, and that a permeance vector sum on the fifth or third harmonic plane of permeances of the two small teeth corresponding to said two sets becomes substantially zero.

A three-phase hybrid type stepping motor according to the present invention is characterized by comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of three-phase each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by a ½ pitch of the small rotor teeth, wherein said small stator teeth are composed of a set of three small stator teeth and two sets of two small stator teeth, and at least one pitch of the adjacent teeth is different from the other pitch of the other adjacent teeth, so that a permeance vector sum on the sixth or third harmonic plane of permeances of the small teeth included in each of said sets becomes substantially zero.

These and other objects and features of the present invention will become apparent from the following description in conjunction with the attached drawings.

DESCRIPTION OF THE PREFERRED EMBODIMENTS

Here, the total permeance of the winding poles of the stator will be first examined, and the cogging torque and the current torque of the structure that the stator small teeth provided at the tip end of each winding pole have a pitch and a tooth width different from those of small teeth of the magnetic pole of the rotor will be then examined.

$$P_2 = \rho_0 + \rho_1\cos\left(\theta_e - \frac{\pi}{3}\right) + \rho_2\cos\left(2\theta_e - \frac{2\pi}{3}\right) + \rho_3\cos\left(3\theta_e - \frac{3\pi}{3}\right) + \rho_4\cos\left(4\theta_e - \frac{4\pi}{3}\right) + \cdots \quad (6)$$

Table 1 shows a sum of all components. It is to be noted that the coefficients $\rho_1, \rho_2, \rho_3, \ldots$ of each order are equal with respect to each polarity, thereby omitting the coefficients.

TABLE 1

| Order | 1 | 2 | 3 | 4 | 5 | 6 |
|---|---|---|---|---|---|---|
| $P_1$ | $\cos(\theta_e)$ | $\cos(2\theta_e)$ | $\cos(3\theta_e)$ | $\cos(4\theta_e)$ | $\cos(5\theta_e)$ | $\cos(6\theta_e)$ |
| $P_2$ | $\cos(\theta_e-\pi/3)$ | $\cos(2\theta_e-2\pi/3)$ | $-\cos(3\theta_e)$ | $\cos(4\theta_e-4\pi/3)$ | $-\cos(5\theta_e-2\pi/3)$ | $\cos(6\theta_e)$ |
| $P_3$ | $\cos(\theta_e-2\pi/3)$ | $\cos(2\theta_e-4\pi/3)$ | $\cos(3\theta)$ | $\cos(4\theta_e-2\pi/3)$ | $-\cos(5\theta_e-\pi/3)$ | $\cos(6\theta_e)$ |
| $P_4$ | $-\cos(\theta_e)$ | $\cos(2\theta_e)$ | $-\cos(3\theta_e)$ | $\cos(4\theta_e)$ | $-\cos(5\theta_e)$ | $\cos(6\theta_e)$ |
| $P_5$ | $-\cos(\theta_e-\pi/3)$ | $\cos(2\theta_e-2\pi/3)$ | $\cos(3\theta_e)$ | $\cos(4\theta_e-4\pi/3)$ | $\cos(5\theta_e-2\pi/3)$ | $\cos(6\theta_e)$ |
| $P_6$ | $-\cos(\theta_e-2\pi/3)$ | $\cos(2\theta_e-4\pi/3)$ | $-\cos(3\theta_e)$ | $\cos(4\theta_e-2\pi/3)$ | $\cos(5\theta_e-\pi/3)$ | $\cos(6\theta_e)$ |
| $\Sigma P_1$ | 0 | 0 | 0 | 0 | 0 | $6\cos(6\theta_e)$ |
| $P_1-P_4$ | $2\cos(\theta_e)$ | 0 | $2\cos(3\theta_e)$ | 0 | $2\cos(5\theta_e)$ | 0 |

A general expression of the torque T with respect to the three-phase hybrid type stepping motor having a normal twelve winding poles is as indicated by Formula 1.

$$T = \frac{N_R}{2}\sum_{i=1}^{S}(F_i - F_0)^2\frac{dP_i}{d\theta_e} \quad (1)$$

Figure 4A:
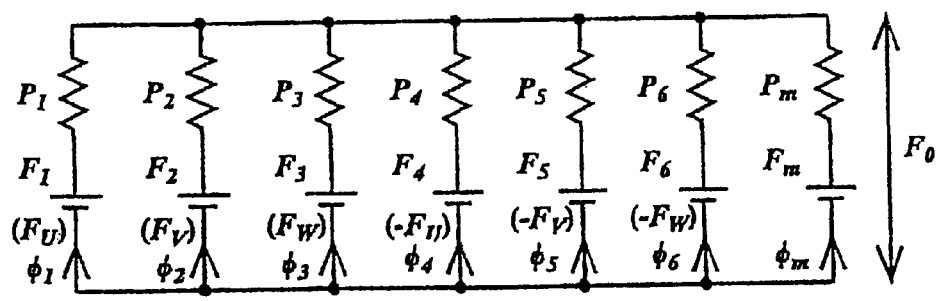
FIG. 4A is an equivalent magnetic circuit diagram showing a circuit of FIG. 3A by one sub circuit.

Here, $F_0$ denotes a reduction in the magnetomotive force of a gap (corresponding to the reduction in the magnetomotive force between the upper and lower poles in FIG. 4A); $N_R$, a number of teeth of the rotor; 2S, a number of winding poles (in the drawing, S=6); and $\theta_e$, an electrical angle.

It is to be noted that $F_0$ can be calculated in accordance with Norton's theorem as expressed by Formula 2.

$$F_0 = \frac{\sum_{i=1}^{S}P_iF_i + P_mF_m}{\sum_{i=1}^{S}P_i + P_m} \quad (2)$$

Furthermore, it is determined that each permeance has a phase difference of 60 degrees and is expressed by Fourier series of Formula 3.

$$P_i = \rho_o + \sum_{j=1}^{\infty}\rho_j\cos j\varsigma_i \quad (3)$$

$\varsigma_i$ is expressed by Formula 4.

$$\varsigma_i = \theta_e - (i-1)\frac{\pi}{3} \quad (4)$$

For example, $P_1$ and $P_2$ can be expressed by Formula 5 and Formula 6.

$$P_1 = \rho_0 + \rho_1\cos\theta_e + \rho_2\cos 2\theta_e + \rho_3\cos 3\theta_e + \rho_4\cos 4\theta_e + \quad (5)$$

In the Table 1, $\Sigma P_i$ is a contribution component with respect to the cogging torque, $P_1-P_4$ are contribution components of the current torque of one phase (U phase). There are other contribution components of the other phases (V, W), which are different merely in phase from the U phase.

The cogging torque T corresponds to the case where the magnetomotive force of the windings is zero ($F_i=0, i=1, 2, 3, 4, 5, 6$) and can be expressed by Formula 7 and Formula 8.

$$T = \frac{N_R}{2}\left(\frac{P_mF_m}{P_T}\right)^2\frac{d}{d\theta_e}\sum_{i=1}^{S}P_i \quad (7)$$

$$P_T = \sum_{i=1}^{S}P_i + P_m \quad (8)$$

Thus, in order to remove the cogging torque, a sum of respective orders of $P_i$ in Formula 7 should be zero.

According to Table 1, in the structure with the twelve winding poles, the cogging torque due to the fifth or lower order harmonic contents becomes zero, and the sixth harmonic content remains.

The primary order is a fundamental wave, but odd number, such as the third and fifth harmonic contents distort the fundamental wave.

The study is carried out in the present invention in order to reduce the odd number, that is, third and fifth harmonic contents in the contribution component of the current torque.

Thus, the permeance of each small tooth provided at the tip end of the winding pole will be examined, and conditions for setting a sum of the odd number harmonic contents of the respective permeances to be zero will be then examined in accordance with each small tooth.

Further, in the three-phase stepping motor having twelve winding poles the sixth harmonic contents are appeared in the cogging torque. Accordingly, in order to remove this cogging torque, the sixth harmonic content of each magnetic pole permeance $P_i$ must be set to zero in each winding pole. A method for the above will be examined, hereinafter.

Figure 5:
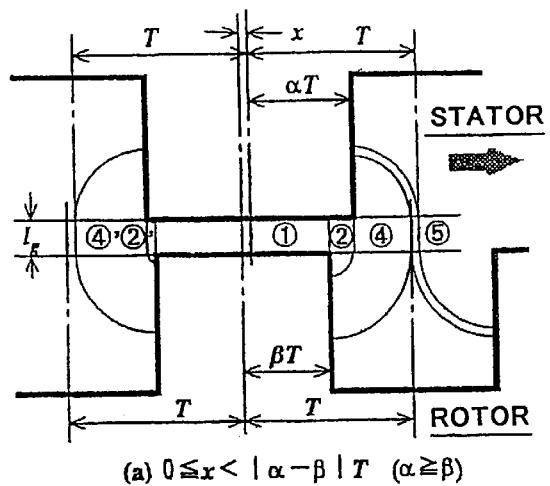
FIG. 5 is an explanation view of imaginary magnetic paths formed between small teeth of a stator and rotor facing each other.

A flow of the magnetic flux differs depending on the relationship of the relative position of the respective small teeth of the stator and the rotor. FIG. 5 partially shows this state. Here, 2T denotes a repetition pitch of the rotor small teeth; α, a ratio of the stator small tooth width to the rotor tooth pitch; β, a ratio of the rotor small tooth width to the rotor small tooth pitch; and x, displacement involved by rotation at the center of the stator small teeth and the center of the rotor small teeth. Since detailed illustration in FIG. 5 leads to complication, only the permeance at a flat surface portion (1) to which the both types of the small teeth are opposed is examined with taking into consideration the fact that the gap dimension is extremely small. The permeance is typically calculated by Formula 9.

$$P = \mu_0 \int \frac{dA}{l} \tag{9}$$

Here, $\mu_0$ designates a space permeability; dA, a differential opposed area; and l, a magnetic path length. Consequently, the permeance P per one small tooth of the winding pole can be obtained in the form of Formula 10. Here, t denotes a lamination thickness of the magnetic core; w, an opposition width; $l_g$, an air gap length.

$$P = \frac{\mu_0 wt}{l_g} \tag{10}$$

Since the permeance P is determined by the opposition width w of the magnetic core, P can be obtained by being aware of the operation of the opposition width of the small teeth of the stator and the small teeth of the rotor when the rotor is rotated. Since the width w linearly varies, it can be understood that the permeance P is as shown in FIGS. 6A and 6B by considering with reference to FIG. 5 showing the structure of the small teeth of the winding poles.

Figure 6A:
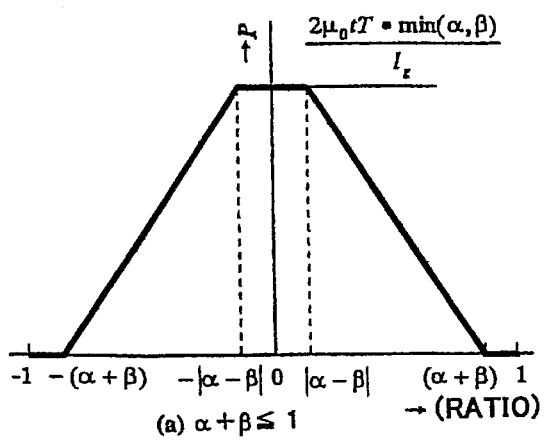
FIG. 6A is an explanation view of the change in permeance between the imaginary magnetic paths of FIG. 5.
Figure 6B:
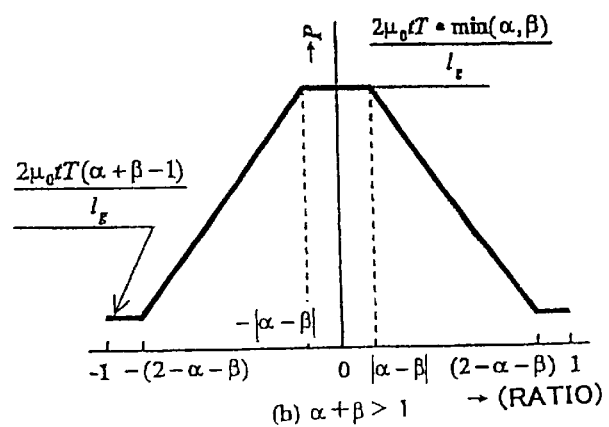
FIG. 6B is an explanation view of the change in permeance between the imaginary magnetic paths of FIG. 5.

Representation of the permeance such as shown in FIGS. 6A and 6B by the Fourier series will now be considered.

Figure 7:
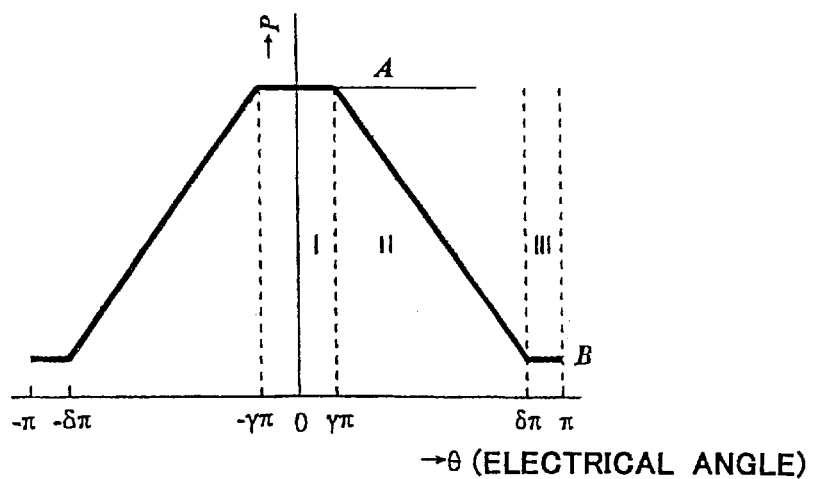
FIG. 7 is an explanation view of the change of general form permeance shown in FIG. 6A and FIG. 6B.

Rendering FIGS. 6A and 6B in the general form, FIG. 7 can be obtained. Here, A and B designate a height of a summit portion and a height of a trough portion; 2γ, a width of the summit portion; and 2δ, a width of a base of a summit portion. When such an even function is expressed by the Fourier series, the term of sin is eliminated and the function takes the form of Formula 11 and Formula 12. It is to be noted that an angle θ substitutes for the distance x. Therefore, a cycle 2T=2π is obtained.

$$f_1(\theta) = \frac{a_0}{2} + \sum_n a_n \cos\theta \tag{11}$$

$$a_n = \frac{2}{\pi}\int_0^\pi f_1 \cos n\theta\, d\theta \tag{12}$$

When the plus angle side in FIG. 7 is represented as a function, it is possible to define with sections being divided as indicated by Formula 13.

$$\begin{aligned}(1)\ & f_1(\theta) = A & 0 \le \theta \le \gamma\pi \\ (2)\ & f_1(\theta) = A - \frac{A-B}{\delta\pi - \gamma\pi}(\theta - \gamma\pi) & \gamma\pi \le \theta \le \delta\pi \\ (3)\ & f_1(\theta) = B & \delta\pi \le \theta \le \pi\end{aligned} \tag{13}$$

When γ, δ, A and B in Formula 13 are set right and represented based on the relationship shown in FIGS. 6A and 6B, Table 2 is obtained. It is to be noted that min (α, β) is a function taking a smaller one of α and β.

TABLE 2

| Condition | $(\alpha + \beta) \le 1$ | $(\alpha + \beta) \ge 1$ |
|---|---|---|
| γ | $\|\alpha - \beta\|$ | $\|\alpha - \beta\|$ |
| δ | $(\alpha + \beta)$ | $(2 - \alpha - \beta)$ |
| A | $\dfrac{2\mu_0 t\min(\alpha, \beta)}{l_g}$ | $\dfrac{2\mu_0 T\min(\alpha, \beta)}{l_g}$ |
| B | 0 | $\dfrac{2\mu_0 tT(\alpha + \beta - 1)}{l_g}$ |

Taking the indefinite integral formulas 14 and 15 into consideration, when the Fourier coefficient of the Formula 12 is calculated, Formulas 16 to 19 are obtained.

$$\int \cos n\theta = \frac{1}{n}\sin n\theta \tag{14}$$

$$\int \theta \cos\theta = \cos\theta + \theta\sin\theta \tag{15}$$

Section 1

$$a_{n1} = \frac{2}{\pi}\int_0^{\gamma\pi} A\cos n\theta\, d\theta = \frac{2A}{n\pi}[\sin n\theta]_0^{\gamma\pi} = \frac{2A}{n\pi}\sin n\gamma\pi \tag{16}$$

Section 2

$$\begin{aligned}a_{n2} &= \frac{2}{\pi}\int_{\delta\pi}^{\gamma\pi}(A + K\gamma\pi - K\theta)\cos n\theta\, d\theta \\ &= \frac{2(A+K\gamma\pi)}{n\pi}[\sin n\theta]_{\gamma\pi}^{\delta\pi} - \frac{2K}{n^2\pi}[\cos n\theta + n\theta\sin n\theta]_{\gamma\pi}^{\delta\pi} \\ &= \frac{2(A+K\gamma\pi)}{n\pi}(\sin n\delta\pi - \sin n\gamma\pi) - \frac{2K}{n^2\pi}(\cos n\delta\pi - \cos n\gamma\pi) - \\ &\quad \frac{2K}{n}(\delta\sin n\delta\pi - \gamma\cos n\gamma\pi)\end{aligned} \tag{17}$$

$$K = \frac{A - B}{\delta\pi - \gamma\pi} \tag{18}$$

Section 3

$$\begin{aligned}a_{n3} &= \frac{2}{\pi}\int_{\delta\pi}^\pi B\cos n\theta\, dx = \frac{2B}{n\pi}[\sin n\theta]_{\delta\pi}^\pi \\ &= -\frac{2B}{n\pi}\sin n\delta\pi\end{aligned} \tag{19}$$

A sum of Formulas 16 to 18 is the Fourier coefficient of a permeance variation $f_i(\theta)$ of one small tooth and can be expressed as Formula 20.

$$a_n = \sum_{j=1}^3 a_{nj} \tag{20}$$

The main torque may be totalized with n=1, and the distortion torque may be totalized with n=odd number harmonic content. In general, since (α+β)≦1, Formula 19 becomes 0, and Formula 16 and Formula 18 are the main constituents of the Fourier coefficient. It is, however, apparent that values of the formulas can be determined by the tooth width ratios α and β except the lamination thickness t and the rotor tooth pitch 2T.

To sum up, (1) the permeance of the small teeth is determined by the tooth width ratios of the rotor and the stator. (It is important that the coefficient varies depending on the tooth width.)

(2) Since even the shortened calculation results in a complicated formula, it is difficult to realize $\Sigma P_i = 0$ by correctly balancing the entire small teeth.

The permeance of each small tooth will now be considered. A flow of the magnetic flux differs depending on the relationship of the relative position of the rotor and the stator. The change in permeance of a small tooth when the rotor is rotated is shown generally in FIGS. 6A and 6B. The change of permeance shown in FIGS. 6A and 6B can be expressed by Fourier series in the form of Formula 21 and Formula 22.

$$P_1(\theta) = \frac{a_0}{2} + \sum_n a_n \cos n\theta \qquad (21)$$

$$a_n = \frac{2}{\pi} \int_0^\pi f_1(\theta) \cos n\theta \, d\theta \qquad (22)$$

Here, $f(\theta) = P_1(\theta)$ is a function of $\theta$ in the form shown in FIG. 7.

Figure 8:
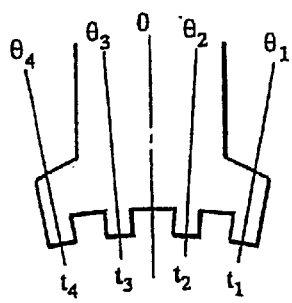
FIG. 8 is an explanation view of the arrangement of small teeth of a magnetic pole having a winding.

It can be, therefore, considered that there are even number small teeth for each winding pole and pairs of two teeth are balanced (a sum of variations in permeance is set to 0) as shown in FIG. 8, so that the contribution component of the current torque of harmonic content is set to 0.

According to the Table 1, it is necessary to make a balance in each of the winding pole in order to set the total sum of the tertiary harmonic contents $2 \cos(3\theta_e)$ to 0.

Assuming that the small teeth of the winding pole are arranged as shown in FIG. 8, Formula 23 should be attained in order to set the tertiary harmonic content to 0. Here, $\theta_k$ denotes a position of each small tooth (electrical angle).

$$P_{13} = \sum_{k=1}^{4} a_3 \cos 3\theta_k = 0 \qquad (23)$$

Figure 9:
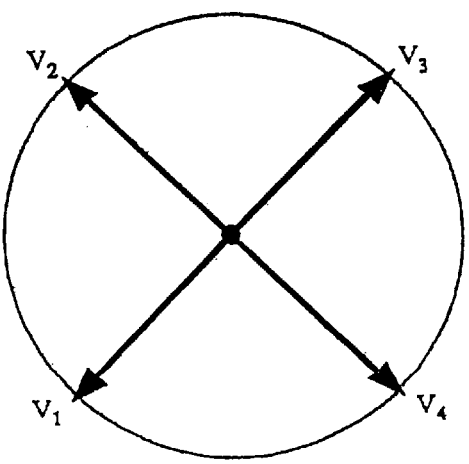
FIG. 9 is an explanation view of vectors showing the magnetic balance about an regular pitch vernier at the tertiary harmonic electrical angle plane.

In case of the regular pitch vernier, the angle arrangement of $3\theta_k$ of the tertiary harmonic content is set by dividing electric angle 360 degrees into 4 (360/4=90°), as shown in FIG. 9.

In this case, $V_k$ denotes a vector having an angle $\theta_k$ and a value of $\alpha_3$. At this time, since every vector corresponds to another vector at the axisymmetric position, such a pair of vectors are canceled out each other. Rotation of each vector while maintaining this relational position can constantly strike a balance during rotation, thereby achieving the Formula 23.

This relation can be expressed by Formula 24.

Here, i is a winding pole number of 1 to 6.

$$\theta_{ik} = (i-1)\frac{2\pi}{3p} + k\frac{2\pi}{4}\frac{1}{3p} \quad k = 0, 1, 2, 3 \qquad (24)$$

When a number of pole pairs of teeth provided to the rotor is 50 for example, the electrical angle 360 degrees in the first term of the Formula 24 corresponds to 7.2 degrees, and distribution can be made every 0.6 degree (machine angle) as the second term based on this electrical angle. 0.6 degree is used for calculation to obtain 90(electrical angle) degrees (0.6×50×3), and the opposed position becomes 180 degrees (90×2).

Figure 10:
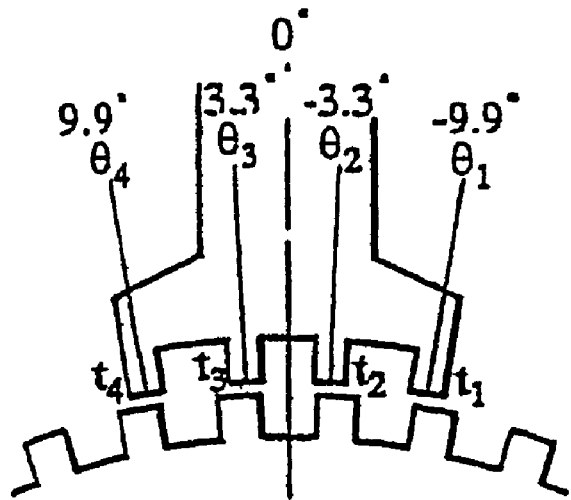
FIG. 10 is an explanation view showing an example of the arrangement of small teeth of a magnetic pole having a winding for obtaining vectors shown in FIG. 9.

The structure of the small teeth is shown in FIG. 10.

In FIG. 10, when a balance is struck between two corresponding vectors, i.e., $V_1$ and $V_4$, $V_2$ and $V_3$, in the sixth harmonic plane, the cogging torque becomes minimum.

The cogging torque may be totalized with n=6. The sixth harmonic content of the permeance for one small tooth which is a source of the cogging torque can be expressed by Formula 25.

$$P_{16} = \alpha_6 \cos 6\theta \qquad (25)$$

Assuming that the small teeth of the winding pole are arranged as shown in FIG. 8, Formula 26 should be attained in order to set the sixth harmonic content to 0.

$$P_{16} = \sum_{k=1}^{4} ab \cos 6\theta_k = 0 \qquad (26)$$

In case of the regular pitch vernier, the angle arrangement of $6\theta_k$ of the sixth harmonic content is set by dividing electric angle 360 degrees into 4 (360/4=90), as shown in FIG. 9.

In this case, $V_k$ denotes a vector having an angle $\theta_k$ and a value of a6. At this time, since every vector corresponds to another vector at the axisymmetric position, such a pair of vectors are canceled out each other. Rotation of each vector while maintaining this relational position can constantly strike a balance during rotation, thereby achieving the Formula 26.

This relation can be expressed by Formula 27.

$$\theta_{ik} = (i-1)\frac{2\pi}{6p} + k\frac{2\pi}{4}\frac{1}{6p} \quad k = 0, 1, 2, 3 \qquad (27)$$

When a number of pole pairs of teeth provided to the rotor is 50 for example, the electrical angle 360 degrees in the first term of the Formula 27 corresponds to 7.2 degrees, and distribution can be made every 0.3 degree (machine angle) as the second term based on this electrical angle.

0.3 degree is used for calculation to obtain 90 (electrical angle) degrees (0.3×50×6), and the opposed position becomes 180 degrees (90×2). The structure of the small teeth is shown in FIG. 10.

In FIG. 10, when a balance is struck between two corresponding vectors, i.e., $V_1$ and $V_4$, $V_2$ and $V_3$, in the sixth harmonic plane, the cogging torque becomes minimum.

Figure 11A:
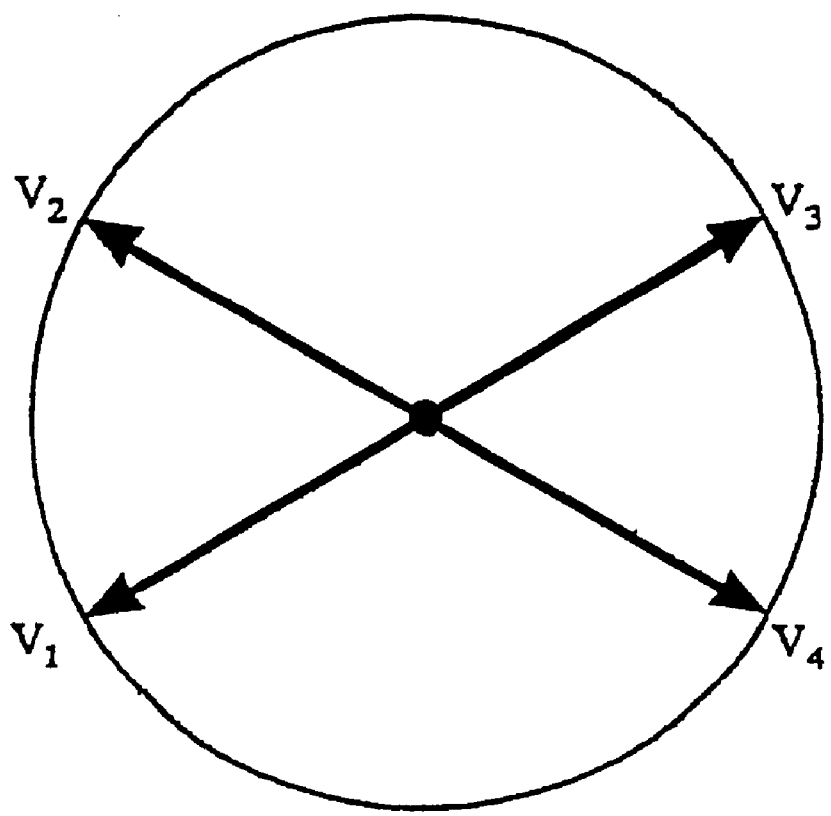
FIG. 11A is an explanation view of vectors showing the magnetic balance between diagonal positions about the irregular pitch vernier.
Figure 11B:
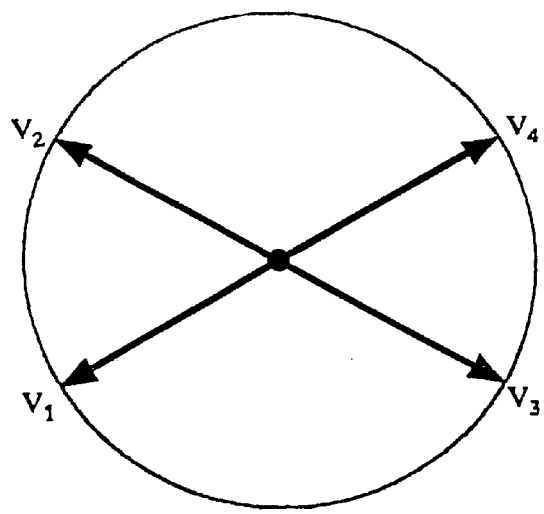
FIG. 11B is an explanation view of vectors showing the magnetic balance between diagonal positions about regular pitch vernier.

The case of the irregular pitch vernier will now be examined. FIG. 11A and FIG. 11B show an example of the vector balance between the respective small teeth in case of the irregular pitch.

FIG. 11A shows a balance between two corresponding vectors, i.e., $V_1$ and $V_3$, $V_2$ and $V_4$.

FIG. 11B shows a balance between two respective vectors, i.e., $V_1$ and $V_4$, $V_2$ and $V_3$.

These cases can be expressed by Formula 28 and the cogging torque becomes 0. Further, in these cases, Formula 28 is achieved and the permeance change of the entire tertiary harmonic contents becomes 0.

$$\sum_{k=1}^{2Q} P_{k3} = 0 \qquad (28)$$

Here, 2Q denotes a number of small teeth of one winding pole.

This means that Formula 29 can be obtained with respect to the angle (machine angle) of a pair of small teeth i and j.

$$\theta_i - \theta_j = \frac{1}{3p}(2m\pi + \pi) \quad (29)$$

Here, m is an integer including 0.

Since $2m\pi$ means the position of the tooth pitch of the small teeth of the rotor, which is not vernier, rewriting the above formula 29 by using a deviation angle $\delta\theta$ from the reference position eventually results in Formula 30.

$$|\delta\theta_i - \delta\theta_j| = \frac{\pi}{3p} \quad (30)$$

The right side of the Formula 30 has 1.2 degrees (machine angle), and the electrical angle is 180 degrees when a number of pole pairs p of small teeth of the rotor is 50.

This can be applied in the case of the regular pitch vernier.

By setting right the method for eliminating the tertiary harmonic torque, the following respects can be obtained.

(1) The difference of the deviated angle $\delta\theta$ in the tertiary harmonic content of each small tooth in one pair is set to an electric angle of 180.

(2) The widths of the respective small teeth are set to be equal.

(3) In the practice, however, it is preferable to make the widths of the respective small teeth identical with each other in order to maintain the symmetry of the iron core.

Figure 12:
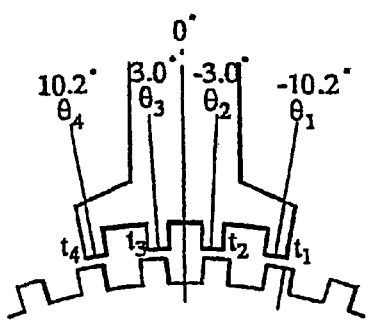
FIG. 12 is an explanation view showing an example of the arrangement of small teeth in case that vectors shown in FIG. 11A can be obtained.

FIG. 12 shows an arrangement of the small teeth in case that the vectors of two pairs are aligned horizontally in FIG. 11A and FIG. 11B.

Figure 13:
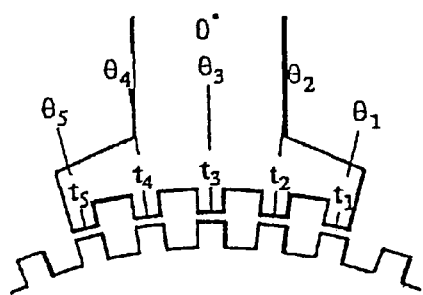
FIG. 13 is an explanation view showing an example of the arrangement of small teeth in case that the number of the small teeth is an odd number or five.
Figure 14:
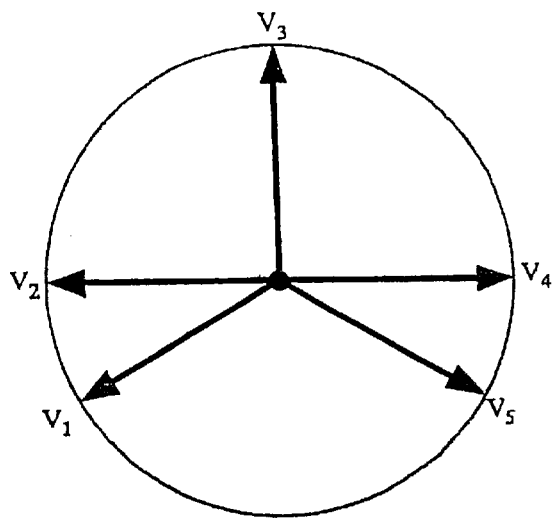
FIG. 14 is an explanation view of vectors showing the magnetic balance in case that the number of the small teeth is an odd number or five.

The above examination has targeted on the case where a number of the small teeth provided to the winding pole is an even number. Examining the case where a number of small teeth is an odd number as shown in FIG. 13, when pairs of small teeth are used to strike a balance in the arrangement of the two small teeth, one fraction is generated in case of the odd number, which produces the inconvenience. Therefore, one small tooth as a fraction must be combined with an arbitrary pair of the small teeth to strike a balance. In case of five small teeth, when two small teeth and three small teeth are used for balancing, the vector relationship between them is as shown in FIG. 14. Here, a balance is struck between three vectors $V_1$, $V_3$ and $V_5$ and between two vectors $V_2$ and $V_4$, respectively.

As stated above, the third harmonic content which is the largest torque distortion formed by the current can be eliminated. Accordingly, the condition for suppressing the fifth harmonic content which is larger torque distortion will be examined.

The condition for balancing two vectors in the fifth harmonic space can be expressed by Formula 31 similar to the case of the third harmonic content.

$$|\delta\theta_i - \delta\theta_j| = \frac{\pi}{5p} \quad (31)$$

In the Formula 31, the right side has 0.72 degree (machine angle) when a number of pole pairs of small teeth of the rotor is 50.

If it is realized together with the Formula 30, the third and fifth harmonic contents can be cancelled at the same time.

The above is a merit of the irregular pitch vernier wherein a balance is struck between the respective small teeth according to the present invention. As a result, it is preferable that two in the four small teeth permeance vectors are deviated by 1.2 degrees (third harmonic contents are balanced), and remaining two are deviated by 0.72 degree (fifth harmonic contents are balanced), respectively. A vector relationship for such condition is shown in FIG. 15.

Figure 16:
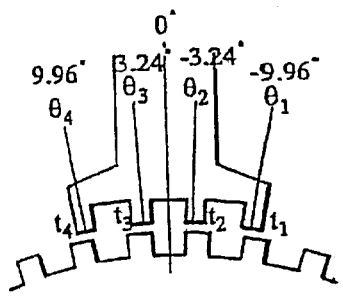
FIG. 16 an explanation view of the arrangement of small teeth for obtaining the balance shown in FIG. 15.

The FIGURE of the iron core in this case is shown in FIG. 16.

Figure 15:
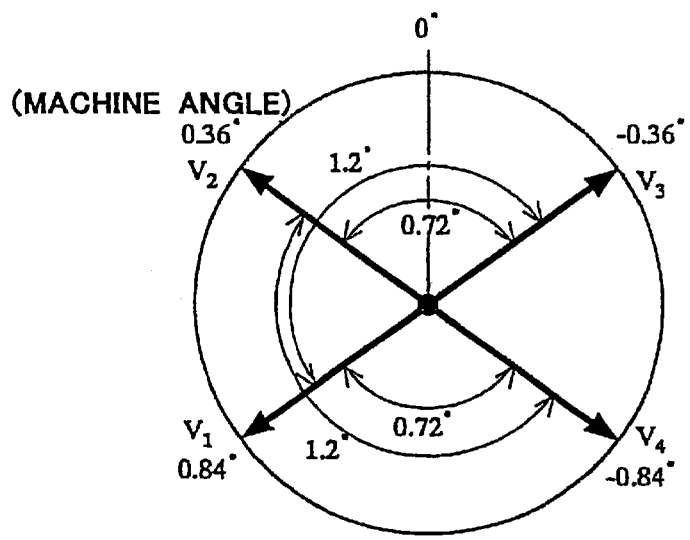
FIG. 15 shows vectors in the third harmonic space in case that the balances are achieved in the third and fifth harmonic contents at the same time.

In the arrangement shown in FIG. 15, the deviation angle difference is 1.2 degrees between the vectors $V_1$ and $V_3$ and the third harmonic angle of the vectors $V_1$ and $V_3$ is 180 degrees.

The vectors $V_2$ and $V_4$ have a relation of 180 degrees similarly.

The deviation angle difference between the composite vectors $V_1$ and $V_3$ and the composite vectors $V_2$ and $V_4$ becomes 0.72 degree (machine angle).

In the arrangement of the small teeth of the iron core shown in FIG. 16, the small teeth $t_1$ and $t_3$ make a pair and the small teeth $t_2$ and $t_4$ make a pair. The difference of the deviation angle $\delta\theta$ from the reference position is set to 1.2 degrees, and the difference of the deviation angle of two pairs is set to 0.72 degree.

By setting right the condition for balancing at the same time the third and fifth harmonic space vectors, the following respects can be obtained.

(1) The difference of the deviation angle $\delta\theta$ in the third harmonic content of each small tooth in the first and second pairs is set to 180 degrees (electrical angle), and the composite vectors in each pair are balanced in the fifth harmonic plane.

(2) The widths of the respective small teeth in each pair are set to be equal.

(3) In the practice, however, it is preferable to make the widths of the respective small teeth identical with each other in order to maintain the symmetry of the iron core.

Next, a manner for eliminating the third and fifth harmonic contents at the same time in the case of the irregular pitch vernier will now be examined.

Examining the case where a number of small teeth is an odd number, when pairs of small teeth are used to strike a balance in the arrangement of the two small teeth, one fraction is generated in case of the odd number, which produces the inconvenience. Therefore, one small tooth as a friction must be combined with an arbitrary pair of the small teeth to strike a balance, as stated above.

However, it is not always necessary to make three vectors of the same value and to arrange the three vectors with an interval of 180 degrees in order to balance the three vectors. A stepping motor wherein a number of teeth of rotor is 100, a number of small teeth provided on each of winding pole is seven, and a fundamental step angle is 0.6 degree will now be explained.

In an orthodox case that a number of teeth of rotor is 100, a tooth pitch is 3.6 degrees (machine angle) and a number of pole pairs p is 100.

The seven small teeth are divided into two groups of two small teeth and one group of three small teeth, a balance of third harmonic contents is achieved in each group, and then a balance of fifth harmonic contents is achieved between the groups.

Figure 17:
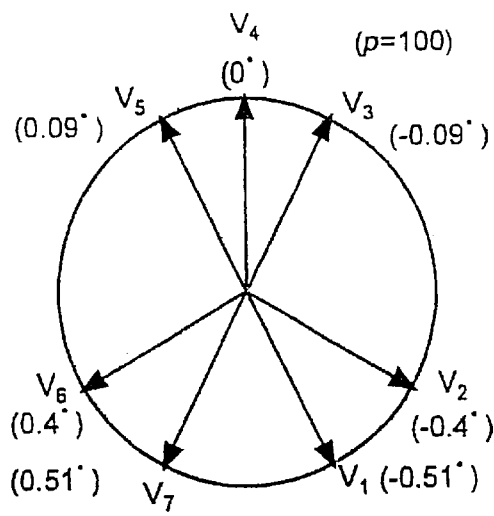
FIG. 17 shows one example of vectors in the tertiary harmonic plane in case that the number of the small teeth is seven.

FIG. 17 shows vectors in the third harmonic plane. In this case, three vectors $V_2$, $V_4$ and $V_6$ make one group, and two vectors $V_1$ and $V_5$, and two vectors $V_3$ and $V_7$ make two groups of two small teeth, respectively. In a first orthodox example, the small teeth in the group of three small teeth are the same in width and arranged with an equal interval of 120 degrees. The three small teeth are positioned as shown in FIG. 17, if one of the three small teeth is located at the center position and the deviation angle is set to 0. Each value indicated with parentheses is a deviation angle (machine angle) from the reference value. There is a difference of 300 times (the number of pole pairs×a number of order of harmonic) between the machine angle and the electrical angle in the third harmonic plane.

In this case, the small teeth are arranged with an interval of 3.6 degrees (360/100), because the reference position is equal with the tooth pitch of the rotor.

The balance in the fifth harmonic plane is achieved by the adjustment of rotary position of the vectors of the group of two small teeth, because the balance condition is obtained if the two small teeth in each group are arranged at the opposite position diametrically.

Figure 18:
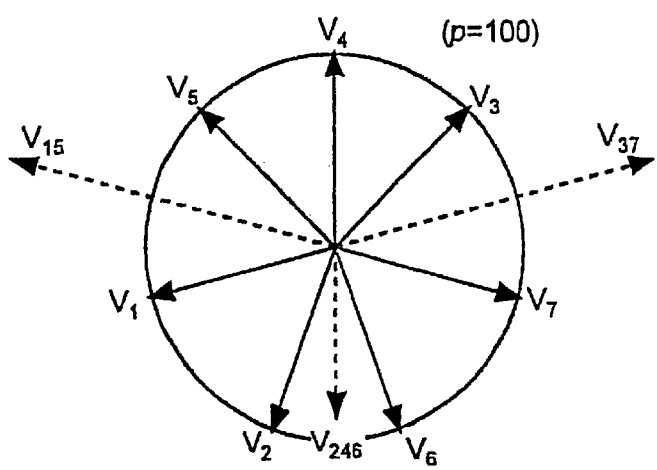
FIG. 18 shows one example of vectors in the fifth harmonic plane in case that the number of the small teeth is seven.

FIG. 18 shows the relation of the vector balance in the fifth harmonic plane. In the fifth harmonic plane, it must pay attention to the fact that the angle becomes 5/3 times of the angle in the third harmonic plane. In the vectors of the group of three small teeth, the vector $V_4$ is arranged at the standard or zero position, and the vectors $V_2$ and $V_6$ are arranged at positions separated from the standard position by 200 degrees (120×5/3), respectively, as shown in FIG. 18. A composite vector $V_{246}$ of the three vectors $V_2$, $V_4$ and $V_6$ in the group of three small teeth has a value of 88% of $V_4$ and directed opposite (180 degrees) to the vector $V_4$.

On the other hand, the vectors $V_1$ and $V_5$ in one group of two small teeth are deviated by 300 degrees (180×5/3) with each other, and a composite vector $V_{15}$ of the vectors $V_1$ and $V_5$ has a value of 173% of $V_1$ at the center angular position of $V_1$ and $V_5$.

The vectors $V_3$ and $V_7$ in the other group are similar to the vectors $V_1$ and $V_5$, and a composite vector $V_{37}$ is obtained.

In FIG. 18, three vectors $V_{246}$, $V_{15}$, and $V_{37}$ are balanced (the sum thereof becomes zero). In this state, the angle between the vectors $V_{15}$ and $V_{37}$ is ±75.3 degrees.

As the vector position shown in FIG. 17, the angle in the third harmonic plane is obtained from the angle in the fifth harmonic plane determined by the above (in FIG. 17, the deviation from the reference angle is expressed by the machine angle in the parentheses).

Figure 19:
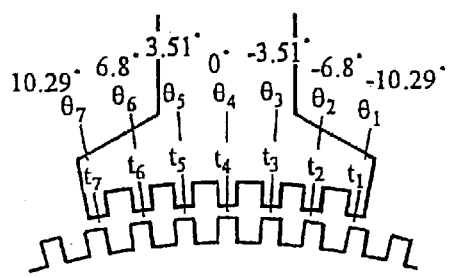
FIG. 19 is an explanation view of the arrangement seven small teeth in said one example.

The teeth configuration of the iron core realized the vector relation shown in the FIG. 17 and FIG. 18 is shown in FIG. 19 wherein the value of the angle is represented by the real angle (machine angle) from the center axis.

Figure 20:
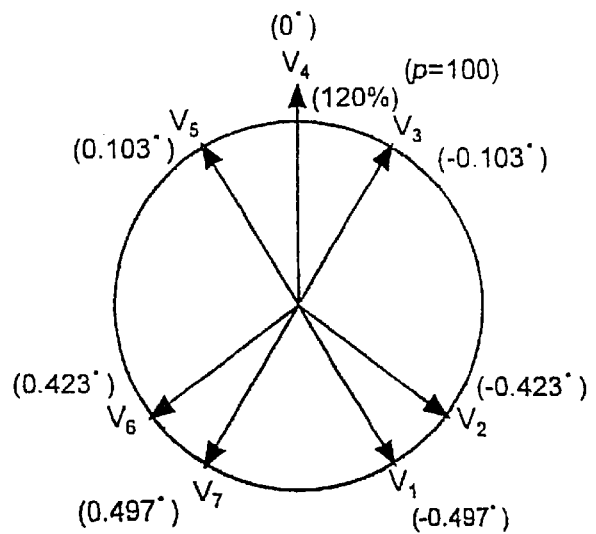
FIG. 20 shows the other example of vectors in the tertiary harmonic plane in case that the number of the small teeth is seven.

FIG. 20 shows the vectors in the third harmonic plane of a second example having the same effect as that of the first example. In the second example, the width of the center tooth $t_4$ between the small teeth is set large and the value of vector is set to be 120%. In this case, the vector $V_4$ is arranged at the standard position of zero, and the angle between the vector $V_2$ and $V_6$ is larger than 120 degrees and set to 126.9 degrees.

Figure 21:
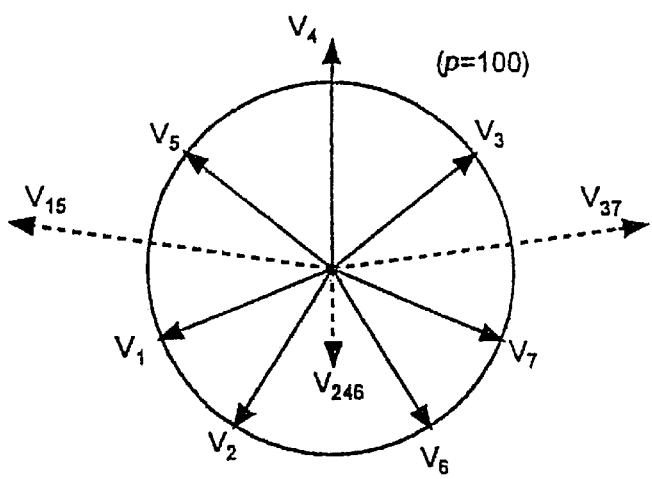
FIG. 21 shows the other example of vectors in the fifth harmonic plane in case that the number of the small teeth is seven.

FIG. 21 shows the vectors $V_4$, $V_2$ and $V_6$ expressed in the fifth harmonic plane. The composite vector $V_{246}$ has a value of 50% of $V_4$ and a direction opposite (180 degrees) to $V_4$. In this case, three vectors $V_{246}$, $V_{15}$ and $V_{37}$ are balanced, and the angle between the vectors $V_{15}$ and $V_{37}$ is ±81.6 degrees.

Figure 22:
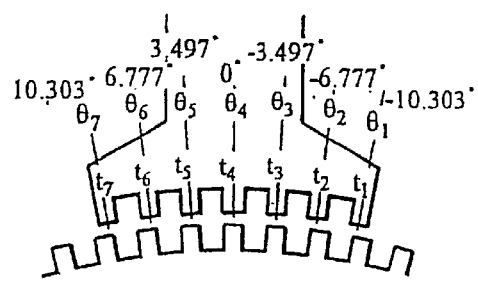
FIG. 22 is an explanation view of the arrangement of seven small teeth in said other example.

As the vector position shown in FIG. 20, the angle in the third harmonic plane is obtained from the angle in the fifth harmonic plane determined by the above. The iron core of this case is shown in FIG. 22, wherein the width of the center of small tooth is larger than that of the iron core shown in FIG. 19, and the magnetic flux passing through the small tooth is slightly increased. According to the second embodiment, the third and fifth harmonic contents can be cancelled as in the first embodiment.

The examination of the reduction in the torque waveform distortion with respect to the three-phase stepping motor wherein a number of teeth of rotor is 100, a number of small teeth provided on each of winding pole is seven, and a fundamental step angle is 0.6 degree will now be explained.

The seven small teeth are divided into two groups of two small teeth and one group of three small teeth, a vector balance on the third harmonic plane is achieved in each group, and a vector balance on the fifth harmonic plane is achieved between the sum of vectors of the group of three small teeth, so that the third and fifth harmonic contents are eliminated.

In this method of balancing three vectors, it is not necessary to arrange vectors of the same value with an interval of 120 degrees, and it may be sufficient to make zero the total sum of two vectors of the same value and one vector of the different value.

In FIG. 11A and FIG. 11B, similarly, Formula 32 and Formula 33 can be obtained with respect to the angle (machine angle) of a pair of small teeth i and j.

$$\theta_{j+2} - \theta_j = \frac{1}{6p}(2m\pi + \pi) \tag{32}$$

$$\theta_{s-j+1} - \theta_j = \frac{1}{6p}(2m\pi + \pi) \; j = 1, \ldots, Q \tag{33}$$

Here, m is an integer including 0, and j is 1, . . . Q.

Further, it is sufficient to obtain this condition in any pair of vectors, so that it is enough to take the balance between the neighboring vectors $V_1$ and $V_2$, and $V_3$ and $V_4$.

Since 2mπ means the position of the tooth pitch of the small teeth of the rotor, which is not vernier, rewriting the above formulas by using a deviation angle δθ from the reference position eventually results in Formula 34 and Formula 35.

$$|\delta\theta_{j+2} - \delta\theta_j| = \frac{\pi}{6p} \tag{34}$$

$$|\delta\theta_{s-j+1} - \delta\theta_j| = \frac{\pi}{6p} \; j = 1, \ldots, Q \tag{35}$$

The right side has 0.6 degrees (machine angle), and the electrical angle is 180 degrees when a number of pole pairs of small teeth of the rotor is 50. By setting right the method for eliminating cogging torque of the irregular pitch vernier according to this system, the following respects can be obtained.

(1) Formula 36 can be obtained with respect to each pair of $t_1$ and $t_3$, and $t_2$ and $t_4$ in case that a number of teeth is P.

$$|\delta\theta_{j+2} - \delta\theta_j| = \frac{30°}{p} \text{(machine angle)} \tag{36}$$

$$j = 1, \ldots, Q \, (0.6° \text{ in case of } 50 \text{ small teeth})$$

Formula 37 can be obtained with respect to each pair of $t_1$ and $t_4$, and $t_2$ and $t_3$.

$$|\delta\theta_{s-j+2} - \delta\theta_j| = \frac{30°}{p} \text{(machine angle)} \; j = 1, \ldots, Q \tag{37}$$

Formula 38 can be obtained with respect to each pair of $t_1$ and $t_2$, and $t_3$ and $t_4$.

$$|\delta\theta_{j+1} - \delta\theta_j| = \frac{30°}{P}(\text{machine angle}) \quad j = 1, \ldots, Q \quad (38)$$

(2) The widths of the respective small teeth are set to be equal. In the practice, however, it is preferable to make the widths of the respective small teeth identical with each other in order to maintain the symmetry of the iron core.

According to this system, each pair of the irregular pitch may be permitted. Accordingly, a larger freedom can be obtained compared with the regular pitch, and there is a chance to improve the waveform or to increase the main torque.

Examining the case where a number of small teeth is an odd number, when pairs of small teeth are used to strike a balance in the arrangement of the two small teeth, one fraction is generated in case of the odd number, which produces the inconvenience. Therefore, one small tooth as a fraction must be combined with an arbitrary pair of the small teeth to strike a balance. In case of five small teeth, when two small teeth and three small teeth are used for balancing, the vector relationship between them is as shown in FIG. 14. Here, a balance is struck between three vectors $V_1$, $V_3$ and $V_5$ and between two vectors $V_2$ and $V_4$, respectively. In this case, the relationship is such that a balance is struck by the angles $\delta\theta_1$, $\delta\theta_3$, $\delta\theta_5$ and the angles $\delta\theta_2$ and $\delta\theta_4$.

In the three-phase stepping motor, windings of poles 1 and 4, 2 and 3, and 3 and 6 are connected in the reverse direction with each other, respectively, so that $P_1$ and $P_4$, $P_2$ and $P_5$, and $P_3$ and $P_6$ affect on the induced voltage as a difference. However, as shown in the table 1, the difference becomes zero with respect to the even number harmonic contents, because they are the same in value and polarity, whereas the difference is multiplies with respect to the odd number harmonic contents, because they are the same in value, but different in polarity. The fundamental wave becomes the basis of the sign wave torque and is important, however, the third and fifth harmonic contents cause the waveform distortion, so that the suppression thereof is necessary.

In case that two vectors are balanced in the sixth harmonic space, with the difference of 0.6 degree (0.6°×6×50=180°), the difference becomes 90 degrees (0.6°×3×50) in the third harmonic space, and becomes 150 degrees (0.6°×5×50) in the fifth harmonic space. It is difficult to cancel out each other at the same time these pair vectors in the plural order harmonic space, because they are difference in angle.

Accordingly, it is examined that the third harmonic content and the cogging torque can be minimized at the same time.

In case that a number of small teeth of the winding pole is four, there are two pairs of vectors separated by 180 degrees with each other.in the sixth harmonic space. The two vectors separated by 180 degrees with each other in the sixth harmonic space become two vectors separated by 90 degrees in the third harmonic space. In order to balance these two pairs of vectors in the third harmonic space, it is necessary to arrange all vectors to be separated by 180 degrees from one another and a sum thereof to be set to zero. This is summarized as follows.

(1) The angle difference $\epsilon$ between the pair of small teeth becomes 30°/P (0.6° in case of 50 small teeth) as shown in the Formula 35 to Formula 37.

(2) The center angle y between said pair vectors becomes 60°/P (1.20 in case of 50 small teeth).

Figure 23:
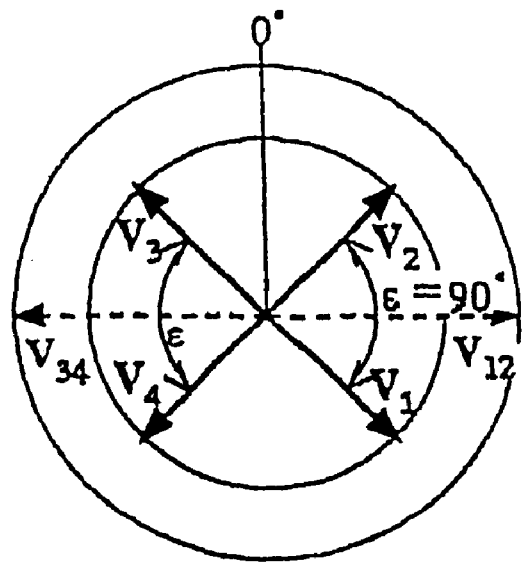
FIG. 23 shows a vector balance in the tertiary harmonic space.

A vector relation shown in FIG. 23 can be considered as a solution of the above condition. That is, it is understood that four vectors are arranged with a regular pitch in the third harmonic plane. In case that a number of teeth of the rotor is 50, the FIGURE of the small teeth is shown in FIG. 10. The sixth harmonic contents relating the cogging torque are balanced in each of pairs of small teeth $t_1$ and $t_2$, and $t_3$ and $t_4$, and the third harmonic contents are balanced between the pairs of small teeth.

Figure 24:
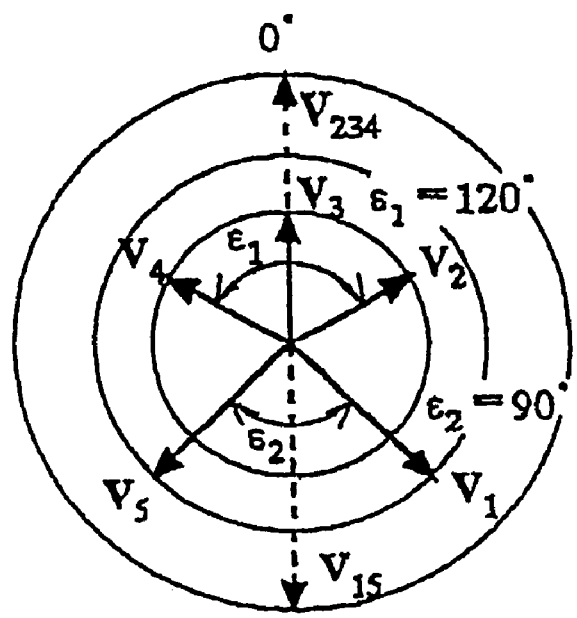
FIG. 24 shows a vector balance in the tertiary harmonic plane in case that the number of the small teeth is five.
Figure 25:
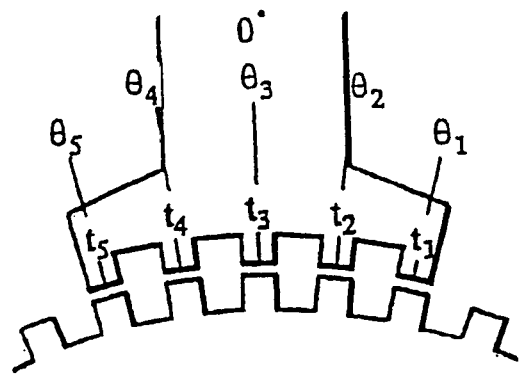
FIG. 25 is an explanation view showing the arrangement of small teeth in case that the number of the small teeth is an odd number or five.

In consideration of the case where a number of small teeth is five, it is preferable to determine the vectors as show in FIG. 24. Specifically, a composite vector $V_{15}$ of the small teeth 1 and 5 of large width and a composite vector $V_{234}$ (indicated by a dotted line) of the small teeth 2, 3 and 4 of small width are balanced. The FIGURE of the small teeth is shown in FIG. 25. It is characterized that the width of the center tooth among the three small teeth is small, and the width of each of the both sides among the three small teeth is large.

Figure 26:
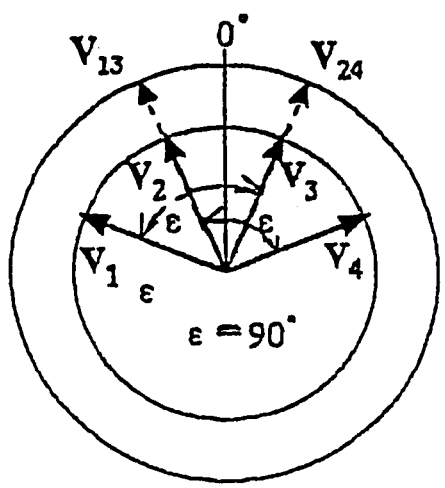
FIG. 26 shows a vector balance about a regular pitch vernier.

FIG. 26 shows the vectors in the third harmonic plane corresponding to the regular pitch vernier shown in FIG. 11A. In this case, the third harmonic distortion in the main magnetic flux, that is, the torque waveform becomes large, because in the third harmonic plane, the vectors are biased and the composite vector becomes large.

Table 3 shows the results of checking how the motor in a practical application is based on the test of a motor manufactured according to the above-described theory. It is to be noted that a unit is machine angle.

As shown in the Table 3, the example of number 04 is the regular pitch vernier and meets with the balance condition of the cogging torque. However, there is such a problem that the third harmonic content is large. The example of number 11 meets with both of the cogging torque balance condition and the small third harmonic component. Accordingly, it is further examined.

TABLE 3

| TYPE | Gi75163 | −04 | −05 | −06 | −07/−10 | −08 | −09 | −11 | −12 |
|---|---|---|---|---|---|---|---|---|---|
| Small Tooth | Reference Angle | δθ | δθ | δθ | δθ | δθ | δθ | δθ | δθ |
| $t_1$ | −10.8° | +0.45 | +0.54 | +0.675 | 0 | +1.95 | +0.675 | +0.9 | +0.9 |
| $t_2$ | −3.6° | +0.15 | +0.18 | +0.225 | 0 | +0.65 | +0.225 | +0.3 | +0.4 |
| $t_3$ | +3.6° | −0.15 | −0.18 | −0.225 | 0 | −0.65 | −0.225 | −0.3 | 0 |
| $t_4$ | +10.8° | +0.45 | −0.54 | −0.675 | 0 | −1.95 | −0.675 | −0.9 | −0.4 |
| $t_5$ | — | — | — | — | — | — | — | — | −0.9 |
| Cogging Torque Balance | | ○ | | | | | | ○ | ○ |
| Third | | | | | | | | ○ | ○ |
| Tooth Width | | REGULAR | REGULAR | REGULAR | REGULAR | REGULAR | REGULAR | REGULAR | IRREGULAR |
| Pitch | | REGULAR | REGULAR | REGULAR* | REGULAR | REGULAR | REGULAR | IRREGULAR | IRREGULAR |
| Remarks | | FIG. 8 | | | | | | FIG. 14 | FIG. 24 |

Figure 2A:
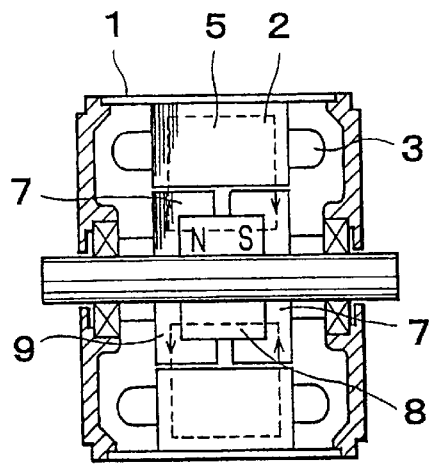
FIG. 2A is a vertically sectional front view of a conventional three-phase hybrid type stepping motor with six poles having windings.
Figure 2B:
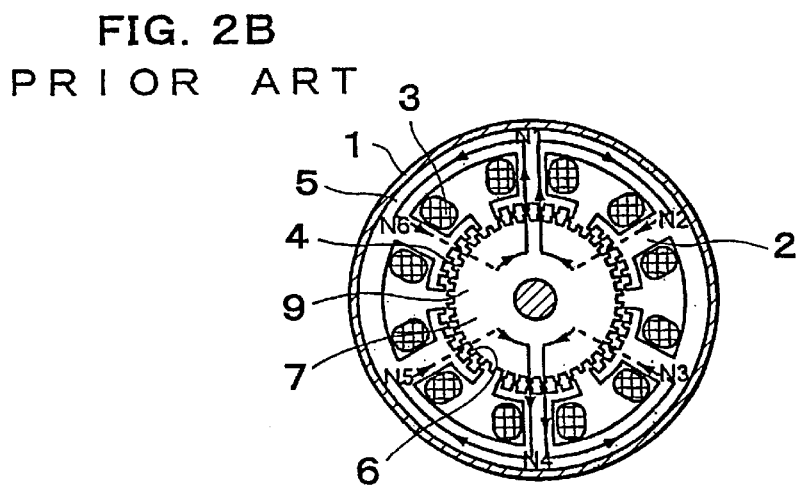
FIG. 2B is a vertically sectional left side (N pole side) view of a conventional three-phase hybrid type stepping motor shown in FIG. 2A.
Figure 2C:
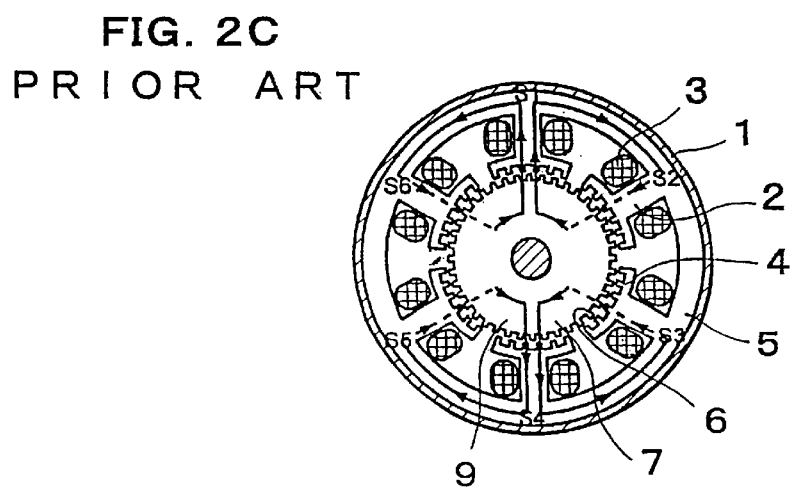
FIG. 2C is a vertically sectional right side (S pole side) view of a conventional three-phase hybrid type stepping motor shown in FIG. 2A.
Figure 3A:
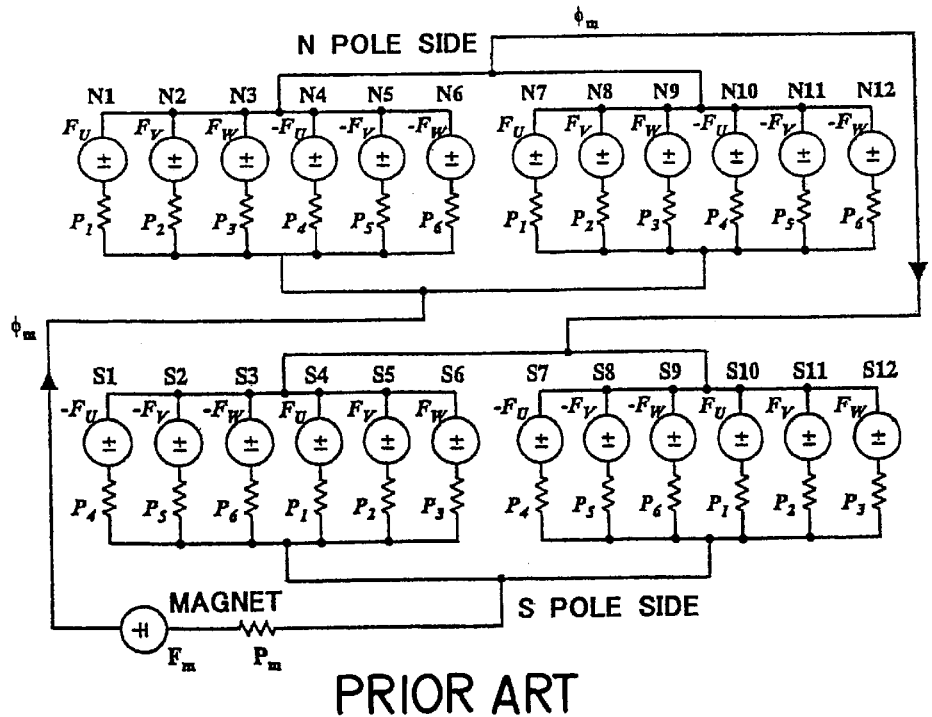
FIG. 3A is an equivalent magnetic circuit diagram of a typical three-phase hybrid type stepping motor with twelve poles having windings.
Figure 3B:
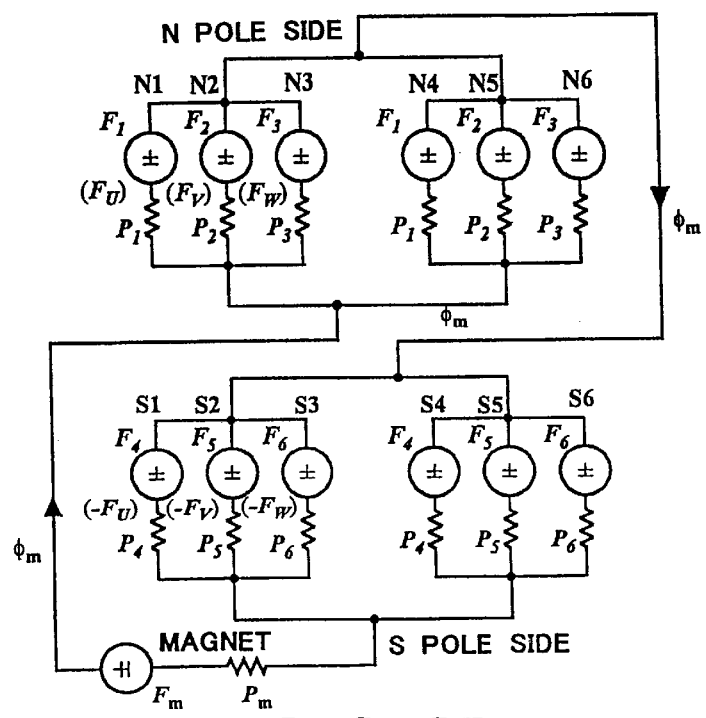
FIG. 3B is an equivalent magnetic circuit diagram of a three-phase hybrid type stepping motor with six poles having windings.

FIG. 3B shows an equivalent magnetic circuit of a stepping motor having six winding poles shown in FIG. 2A to FIG. 2C. In FIG. 3B, $P_4$ $P_5$ and $P_6$ show permeances in reverse phase relation (the top of small tooth of N pole side is faced to the bottom of small tooth of S pole side) with the permeances of $P_1$, $P_2$ and $P_3$, respectively. At the S pole side, the direction of flux flow is opposite to the direction of the flux flow at the N pole side, so that the polarity of the magnetomotive force becomes negative.

Figure 1A:
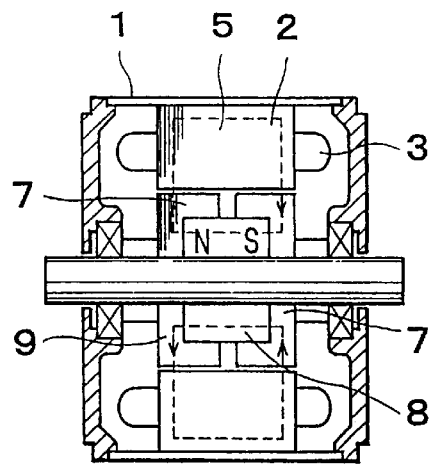
FIG. 1A is a vertically sectional front view of a conventional three-phase hybrid type stepping motor with twelve poles having windings.
Figure 1B:
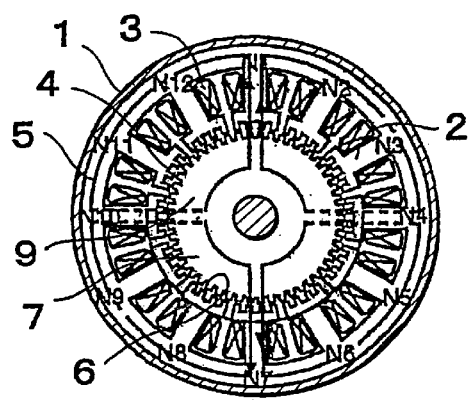
FIG. 1B is a vertically sectional left side (N pole side) view of a conventional three-phase hybrid type stepping motor shown in FIG. 1A.
Figure 1C:
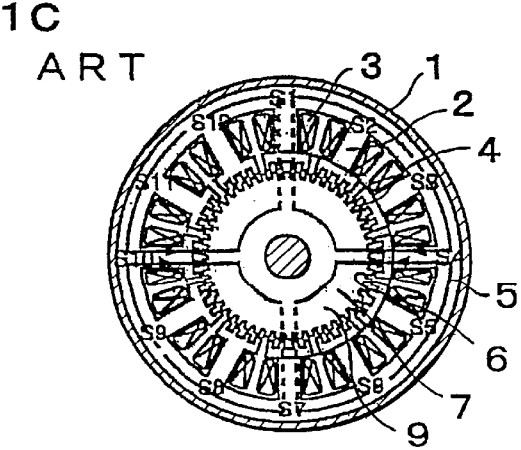
FIG. 1C is a vertically sectional right side (S pole side) view of a conventional three-phase hybrid type stepping motor shown in FIG. 1A.
Figure 4B:
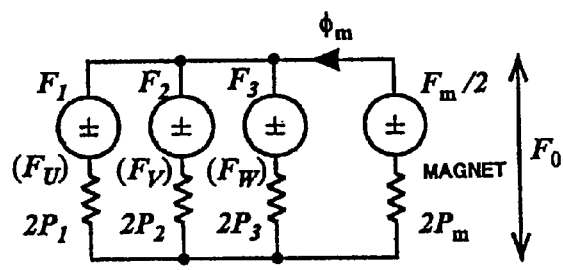
FIG. 4B is an equivalent magnetic circuit diagram of N poles side of a three-phase hybrid type stepping motor with six poles having windings.
Figure 4C:
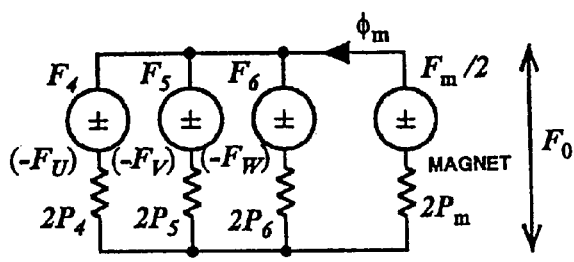
FIG. 4C is an equivalent magnetic circuit diagram of S pole side of a three-phase hybrid type stepping motor with six poles having windings.

In the stepping motor having twelve winding poles shown in FIG. 1A to FIG. 1C, four sub circuits are the same with one another. In the stepping motor having six winding poles shown in FIG. 2A to FIG. 2C, however, only two sub circuits at the N pole side and S pole side are the same with each other, so that they cannot be summarized to one sub circuit, and are expressed by forms shown in FIG. 4B and FIG. 4C wherein other sub circuits are connected at the N pole side and S pole side, respectively. Here, the magnetomotive force is divided into two at the N pole side and the S pole side. The distortions of the cogging torque and the current torque will be examined by utilizing the equivalent circuits shown in FIG. 4B and FIG. 4C. The torque to be generated relates to the total permeance of the winding poles, so that the torque is calculated under the consideration that the small teeth of the stator pole have a pitch different from the pitch of small teeth of the rotor.

A general expression of the torque T with respect to the three-phase hybrid type stepping motor having six winding poles is as indicated by Formula 39 assuming from the case of twelve winding poles.

$$T = N_R \sum_{i=1}^{2S} (F_i - F_0)^2 \frac{dP_i}{d\theta_e} \quad (39)$$

Here, $F_0$ denotes reduction in the magnetomotive force of a gap; $N_R$, a number of teeth of the rotor; 2S, a number of winding poles (in the drawing, S=3); and $\theta_e$, an electrical angle.

It is to be noted that $F_0$ can be calculated in accordance with Norton's theorem as expressed by Formula 40.

$$F_0 = \frac{\sum_{i=1}^{S} P_i F_i + P_m F_m}{2 \sum_{i=1}^{S} P_i + 2 P_m} \quad (40)$$

Further, it is determined that each of permeances $P_1$ $P_2$ and $P_3$ have a phase difference of 120 degrees and is expressed by Fourier series of Formula 41, 42 and Formula 43.

$$P_i = \rho_0 + \sum_{j=1}^{\infty} \rho_j \cos j\varsigma_j \quad (i = 1, 2, 3) \quad (41)$$

$$\varsigma_1 = \theta_e - (i-1)\frac{2\pi}{3} \quad (i = 1, 2, 3) \quad (42)$$

$P_1 = \rho_0 + \rho_1 \cos \theta_e + \rho_2 \cos 2\theta_e + \rho_3 \cos 3\theta_e + \rho_4 \cos 4\theta_e + \rho_5 \cos 5\theta_e + \rho_6 \cos 6\theta_e$ $$P_2 = \rho_0 + \rho_1\cos\left(\theta_e - \frac{2\pi}{3}\right) + \rho_2\cos\left(2\theta_e - \frac{4\pi}{3}\right) + \quad (43)$$
$$\rho_3\cos\left(3\theta_e - \frac{6\pi}{3}\right) + \rho_4\cos\left(4\theta_e - \frac{8\pi}{3}\right) +$$
$$\rho_5\cos\left(5\theta_e - \frac{10\pi}{3}\right) + \rho_6\cos\left(6\theta_e - \frac{12\pi}{3}\right)$$

$$P_3 = \rho_0 + \rho_1\cos\left(\theta_e - \frac{4\pi}{3}\right) + \rho_2\cos\left(2\theta_e - \frac{8\pi}{3}\right) +$$
$$\rho_3\cos\left(3\theta_e - \frac{12\pi}{3}\right) + \rho_4\cos\left(4\theta_e - \frac{16\pi}{3}\right) +$$
$$\rho_5\cos\left(5\theta_e - \frac{20\pi}{3}\right) + \rho_6\cos\left(6\theta_e - \frac{24\pi}{3}\right)$$

Further, the permeances of $P_4$, $P_5$ and $P_6$ can be expressed by Formula 44 to Formula 47.

$$P_{i+2} = \rho_0 + \sum_{j=1}^{\infty} \rho_i \cos j(\varsigma_1 - \pi) \quad (i = 1, 2, 3) \quad (44)$$

$P_4 = \rho_0 - \rho_1 \cos \theta_e + \rho_2 \cos 2\theta_e - \rho_3 \cos 3\theta_e + \rho_4 \cos 4\theta_e - \rho_{51} \cos 5\theta_e + \rho_6 \cos 6\theta_e$ (45)

$$P_5 = \rho_0 - \rho_1\cos\left(\theta_e - \frac{2\pi}{3}\right) + \rho_2\cos\left(2\theta_e - \frac{4\pi}{3}\right) - \rho_3\cos\left(3\theta_e - \frac{6\pi}{3}\right) + \quad (46)$$
$$\rho_4\cos\left(4\theta_e - \frac{8\pi}{3}\right) - \rho_5\cos\left(5\theta_e - \frac{10\pi}{3}\right) + \rho_6\cos\left(6\theta_e - \frac{12\pi}{3}\right)$$

$$P_6 = \rho_0 - \rho_1\cos\left(\theta_e - \frac{4\pi}{3}\right) + \rho_2\cos\left(2\theta_e - \frac{8\pi}{3}\right) - \rho_3\cos\left(3\theta_e - \frac{12\pi}{3}\right) + \quad (47)$$
$$\rho_4\cos\left(4\theta_e - \frac{16\pi}{3}\right) - \rho_5\cos\left(5\theta_e - \frac{20\pi}{3}\right) + \rho_6\cos\left(6\theta_e - \frac{24\pi}{3}\right)$$

Table 4 shows $P_i$ order harmonic components, a sum of contribution components with respect to the cogging torque, and contribution components of the current torque of one phase (U phase).

TABLE 4

| Order | 1 | 2 | 3 | 4 | 5 | 6 |
|---|---|---|---|---|---|---|
| $P_1$ | $\cos(\theta_e)$ | $\cos(2\theta_e)$ | $\cos(3\theta_e)$ | $\cos(4\theta_e)$ | $\cos(5\theta_e)$ | $\cos(6\theta_e)$ |
| $P_2$ | $\cos(\theta_e - 2\pi/3)$ | $\cos(2\theta_e - 4\pi/3)$ | $\cos(3\theta_e)$ | $\cos(4\theta_e - 2\pi/3)$ | $\cos(5\theta_e - 4\pi/3)$ | $\cos(6\theta_e)$ |
| $P_3$ | $\cos(\theta_e - 4\pi/3)$ | $\cos(2\theta_e - 2\pi/3)$ | $\cos(3\theta_e)$ | $\cos(4\theta_e - 4\pi/3)$ | $\cos(5\theta_e - 2\pi/3)$ | $\cos(6\theta_e)$ |
| $P_4$ | $-\cos(\theta_e)$ | $\cos(2\theta_e)$ | $-\cos(3\theta_e)$ | $\cos(4\theta_e e)$ | $-\cos(5\theta_e)$ | $\cos(6\theta_e)$ |
| $P_5$ | $-\cos(\theta_e - 2\pi/3)$ | $\cos(2\theta_e - 4\pi/3)$ | $-\cos(3\theta_e)$ | $\cos(4\theta_e - 2\pi/3)$ | $-\cos(5\theta_e - 4\pi/3)$ | $\cos(6\theta_e)$ |
| $P_6$ | $-\cos(\theta_e - 4\pi/3)$ | $\cos(2\theta_e - 2\pi/3)$ | $-\cos(3\theta_e)$ | $\cos(4\theta_e - 4\pi/3)$ | $-\cos(5\theta_e - 2\pi/3)$ | $\cos(6\theta_e)$ |
| $\Sigma P_1$ | 0 | 0 | 0 | 0 | 0 | $6\cos(6\theta_e)$ |
| $P_1 - P_4$ | $2\cos(\theta_e)$ | 0 | $2\cos(3\theta_e)$ | 0 | $2\cos(5\theta_e)$ | 0 |

According to the table 4, in the structure of the stepping motor with the six winding poles, the cogging torque due to the fifth or lower order harmonic contents becomes zero, but the sixth harmonic contents become the same phase and remain. Accordingly, in order to remove the cogging torque, the sixth harmonic content should be removed.

In consideration of the U phase winding, $F_1$ and $F_4$ shown in FIG. 3B are reverse polarity, so that the effects of the $P_1$ and $P_4$ are added differentially. Accordingly, in the V phase, the effects of $P_2$ and $P_5$ are added differentially with each other, and in the W phase, the effects of $P_3$ and $P_6$ are added differentially with each other to form the interlinkage magnetic flux.

According to the Table 4, the relation of the Fourier series of the harmonic contents will now be considered. It is appreciated that the even number harmonic contents are cancelled out each other, but the odd number harmonic contents are added with each other.

Accordingly, the U phase components $P_1$ and $P_4$ contributing the current torque become zero in case of even number harmonic contents, but remain in case of odd number harmonic contents.

This can be applied similarly to the V phase and W phase. The primary harmonic component is a fundamental wave, but the third and fifth harmonic components are unfavorable, because they disturb the fundamental sign wave. In order to improve the waveform of the current torque, it is favorable to remove the third harmonic component and then fifth harmonic component.

As stated above, it is apparent that the stepping motor having six winding poles has the same problem with the stepping motor having twelve winding poles, so that the manner for reducing the cogging torque and the distortions of the current torque in the stepping motor of twelve winding poles can be applied similarly to the stepping motor having six winding poles.

In good order, the case of the conventional regular pitch vernier will be first examined. The sixth harmonic content of the permeance for one small tooth can be expressed by Formula 48.

$$P_{16} = \alpha_6 \cos 6\theta_e \quad (48)$$

Figure 27:
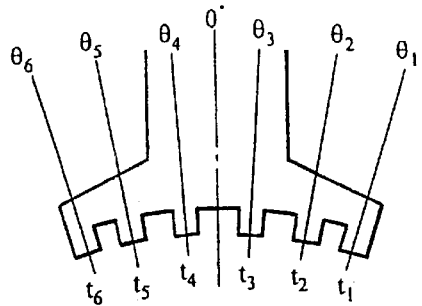
FIG. 27 is an explanation view showing the arrangement of small teeth of a pole having a winding.

Assuming that the small teeth of the winding pole are arranged as shown in FIG. 27, Formula 49 should be attained in order to set the fourth harmonic content to 0. Here, $\theta_k$ denotes a position of each small tooth (electrical angle), and Q denotes a number of small teeth of one winding pole.

$$P_{16} = \sum_{k=1}^{Q} a_6 \cos 6\theta_k = 0 \quad (49)$$

Figure 28:
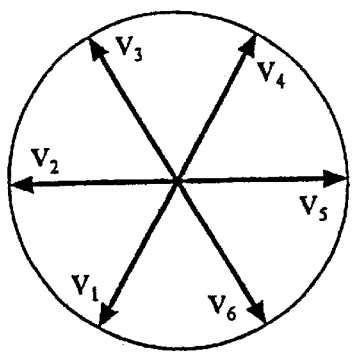
FIG. 28 shows a vector balance in the sixth harmonic plane about the regular pitch vernier.

In case of the conventional regular pitch vernier, the small teeth $t_k$ are distributed with the equal tooth width and at equal intervals. FIG. 28 shows vector arrangement on the sixth harmonic plane in this case.

In this case, each vector $V_k$ can be distributed by dividing 360 degrees into six sections (360/6=60). At this time, since every vector corresponds to another vector at the axisymmetric position, such a pair of vectors are canceled out each other. Rotation of each vector while maintaining this relational position can constantly strike a balance during rotation, thereby achieving the Formula 49. This angular relation can be expressed by Formula 50. Here, m is an integer including 0.

$$\theta_k = m\frac{2\pi}{p} + k\frac{2\pi}{6p}\frac{1}{Q} \quad k = 0, 1, \ldots 5 \quad (50)$$

When a number of pole pairs of teeth provided to the rotor is 40 in the construction shown in FIG. 2A to FIG. 2C, for example, the electrical angle 360 degrees in the first term corresponds to machine angle 9 degrees, and distribution can be made every machine angle 0.25 degree as the second term based on this electrical angle.

The machine angle 0.25 degree is used for calculation to obtain the electrical angle 60 degrees (0.25×40×6), and the opposed position becomes 180 degrees (60×3). In case of the regular pitch vernier, although the equal tooth width is usually used, all the tooth widths do not have to be the same if the widths of the opposed teeth are equal.

Figure 29A:
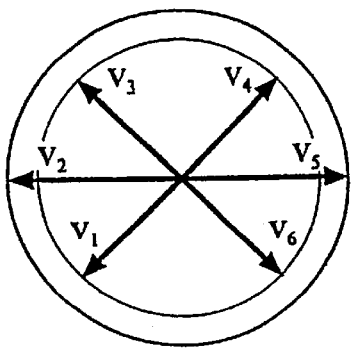
FIG. 29A shows a vector balance between two vectors in the sixth harmonic plane about irregular pitch vernier.
Figure 29B:
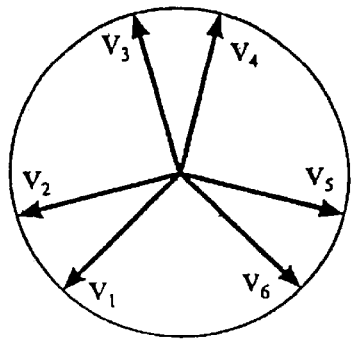
FIG. 29B shows a vector balance between three vectors in the sixth harmonic plane about irregular pitch vernier.

The case of the irregular pitch vernier will now be examined. FIG. 29A and FIG. 29B shows an example of the vector relation between the respective small teeth in case of the irregular pitch.

In FIG. 29A, when a balance is struck between two corresponding vectors, i.e., $V_1$ and $V_4$, $V_2$ and $V_5$, and $V_3$ and $V_6$, $P_{16}=0$ is attained on the whole and the cogging torque also becomes minimum, which can be expressed by Formula 51.

$$P_{16} = \sum_{k=1}^{Q} P_{16} = 0 \quad (51)$$

If such a relationship as that vectors in each pair of vectors are canceled out each other (balance condition) is satisfied, arrangement of each pair of vectors may be arbitrary. This is the principle of minimization of the cogging torque. Although there are various kinds of corresponding relationships of the vectors to be balanced, the following three types can be typically considered.

(1) Formula 52 can be obtained between the adjacent small teeth.

$$\theta_{2k} - \theta_{2k-1} = \frac{1}{6p}(2m\pi + \pi) \quad k = 1, 2, 3 \quad (52)$$

(2) Formula 53 can be obtained between the small teeth at diagonal positions.

$$\theta_{k+3} - \theta_k = \frac{1}{6p}(2m\pi + \pi) \quad k = 1, 2, 3 \quad (53)$$

(3) Formula 54 can be obtained between the small teeth at axisymmetrical positions with the central axis therebetween.

$$\theta_{Q-k+1} - \theta_k = \frac{1}{6p}(2m\pi + \pi) \quad k = 1, 2, 3 \quad (54)$$

Since $2m\pi$ means that the same pitch angle is used as that of the small teeth of the rotor, rewriting the above formulas by using a deviation angle $\delta\theta$ from the reference position eventually results in Formulas 55 to 57.

$$\varepsilon = |\delta\theta_{2k} - \delta\theta_{2k-1}| = \frac{\pi}{6p} \quad k = 1, 2, 3 \quad (55)$$

-continued $$\varepsilon = |\delta\theta_{k+3} - \delta\theta_k| = \frac{\pi}{6p} \quad k = 1, 2, 3 \tag{56}$$

$$\varepsilon = |\delta\theta_{Q-k+1} - \delta\theta_k| = \frac{\pi}{6p} \quad k = 1, 2, 3 \tag{57}$$

(2) The widths of the respective small teeth are set to be equal.

In the practice, the width of the small tooth is determined in consideration of the symmetry of the iron core in case of FIG. 29A and FIG. 29B.

Test samples of the small teeth arrangement according to the above will be shown in Table 5.

TABLE 5

| Type Small Tooth | Reference Angle | Regular Pitch 1 δ | Tooth Width | Test Sample 1 δθ | Tooth Width | Test Sample 2 δθ | Tooth Width | Test Sample 3 δθ | Tooth Width | Test Sample 4 δθ | Tooth Width |
|---|---|---|---|---|---|---|---|---|---|---|---|
| $t_1$ | −22.5 | +0.625 | 40% | +0.5625 | 38% | +0.375 | 35% | +0.375 | 40% | +0.55 | 40% |
| $t_2$ | −13.5 | +0.375 | 40% | +0.375 | 42% | +0.375 | 38% | −0.375 | 40% | +0.45 | 40% |
| $t_3$ | −4.5 | +0.125 | 40% | +0.1875 | 38% | +0.375 | 42% | +0.375 | 40% | +0.05 | 40% |
| $t_4$ | +4.5 | −0.125 | 40% | −0.1875 | 38% | −0.375 | 42% | −0.375 | 40% | −0.05 | 40% |
| $t_5$ | +13.5 | −0.375 | 40% | −0.375 | 42% | −0.375 | 38% | +0.375 | 40% | −0.45 | 40% |
| $t_6$ | +22.5 | −0.625 | 40% | −0.5625 | 38% | −0.375 | 35% | −0.375 | 40% | −0.55 | 40% |
| Balance |  |  |  |  |  |  |  |  |  |  |  |
| Adjacent Poles | (0.75) |  |  |  |  |  |  | ○ |  | Three Poles (0.5) |  |
| Diagonal Poles | (0.75) | ○ |  | ○ |  |  |  | ○ |  |  |  |
| Symmetric Poles |  |  |  |  |  | ○ |  | ○ |  |  |  |
| Axisymmetry |  | ○ |  | ○ |  | ○ |  | ○ |  | ○ |  |

The right side has machine angle 0.75 degree, and the electrical angle is 180 degrees when a number p of small teeth of the rotor=40.

By setting right the method for eliminating the cogging torque of the irregular pitch vernier according to this system, the following Formulas 58 to 60 can be obtained.

(1) When a number of small teeth of the rotor is p, the following formulas 58, 59 and 59 should be achieved.

(a) Formula 58 is obtained with respect to a difference angle ε between the respective adjacent small teeth, i.e., $t_1$ and $t_2$, $t_3$ and $t_4$, and $t_5$ and $t_6$.

$$\varepsilon = |\delta\theta_{2k} - \delta\theta_{2k-1}| = \frac{180}{6p} \text{ (machine angle)} \tag{58}$$

$k = 1, 2, 3$ (in case of $p = 40$, it is 0.75 degree)

(b) Formula 59 can be obtained with respect to a difference angle of each diagonal pairs of $t_1$ and $t_4$, $t_2$ and $t_5$, and $t_3$ and $t_6$.

$$\varepsilon = |\delta\theta_{k+3} - \delta\theta_k| = \frac{180}{6p} \text{ (machine angle)} \tag{59}$$

$k = 1, 2, 3$ (in case of $p = 40$, it is 0.75 degree)

(c) Formula 60 can be obtained with respect to each axisymmetric pairs of $t_1$ and $t_6$, $t_2$ and $t_5$, and $t_3$ and $t_4$.

$$\varepsilon = |\delta\theta_{Q-k+1} - \delta\theta_k| = \frac{180}{6p} \text{ (machine angle)} \tag{60}$$

$k = 1, 2, 3$ (in case of $p = 40$, it is 0.75 degree)

In Table 5, a sum of the reference angle and δθ becomes an angle of $\theta_k$ from the center line of the winding pole having the small tooth $t_k$.

Further, the equal pitch corresponds to FIG. 28 and the test sample 1 corresponds to FIG. 29A. The test sample 2 corresponds to a case wherein the width of small tooth, is different from that of the axisymmetric small tooth and the test sample 3 corresponds to a case wherein the difference becomes 0.75 degree in all cases.

Figure 30:
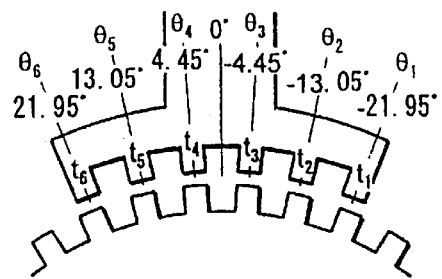
FIG. 30 is an explanation view showing the arrangement of small teeth shown in FIG. 29B.

In case that a number of the small teeth is six, further, the six small teeth are divided into two groups of three small teeth and a valance is achieved in each group, as shown in FIG. 29B. In this case, $V_1$, $V_3$ and $V_5$ make one group and $V_2$, $V_4$ and $V_6$ make the other group. In each group, vectors are balanced with one another by the difference of 120 degrees. The test sample 4 in the Table 5 shows the small teeth arrangement. In this case, three vectors are the same in width and are arranged with an interval of 120 degrees with one another. It is possible to take the balance between the three vectors by making the width of one small tooth, such as $V_1$ or $V_6$ large and the distance between remaining two vectors, such as $V_3$ and $V_5$ or $V_4$ and $V_6$ narrow. The structure of the small teeth of the winding poles of FIG. 29B is shown in FIG. 30.

Next, a manner for removing the third harmonic contents of the current torque will be examined. In order to eliminate the third harmonic contents 2 cos (3θ) of the current torque, it is necessary to balance the third harmonic contents in each winding pole and to attain Formula 61.

$$P_{13} = \sum_{k=1}^{Q} a_3 \cos 3\theta_k = 0 \tag{61}$$

Here, $\theta_k$ denotes a position of each small tooth (electrical angle).

Figure 31A:
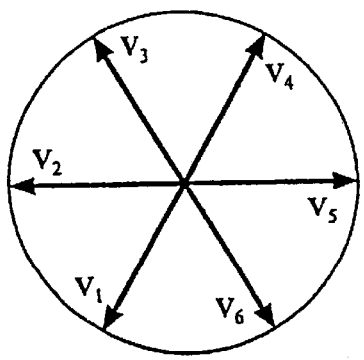
FIG. 31A shows a vector balance in the tertiary harmonic plane about the regular pitch vernier.

In case of the regular pitch vernier, the angle arrangement of $3\theta_k$ of the tertiary harmonic content is set by dividing electric angle 360 degrees into Q sections, (in this case 360/6=90), as shown in FIG. 31A similar to FIG. 28. In this case, $V_k$ denotes a vector having an angle $\theta_k$ and a value of $a_3$. At this time, since every vector corresponds to another vector at the axisymmetric position, such a pair of vectors are canceled out each other. Rotation of each vector while maintaining this relational position can constantly strike a balance during rotation, thereby achieving the Formula 61.

This relation can be expressed by Formula 62.

$$\theta_{ik} = (i-1)\frac{2\pi}{3p} + k\frac{2\pi}{3p}\frac{1}{Q} \quad k = 1, 2, 3 \tag{62}$$

Here, i is a winding pole number of 1 to 6.

When a number of pole pairs of teeth provided to the rotor is 40 for example, the electrical angle 360 degrees in the first term of the Formula 62 corresponds to machine angle 9 degrees, and distribution can be made every 0.5 degree (machine angle) as the second term based on this electrical angle.

0.5 degree is used for calculation to obtain 0.5×40×3=60, (electrical angle), and the opposed position becomes 60×3=180 degrees.

Figure 31B:
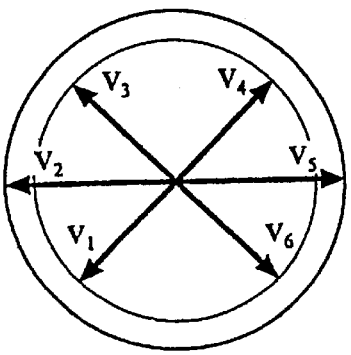
FIG. 31B shows a magnetically balanced state between two vectors in the tertiary harmonic electrical angle plane.
Figure 31C:
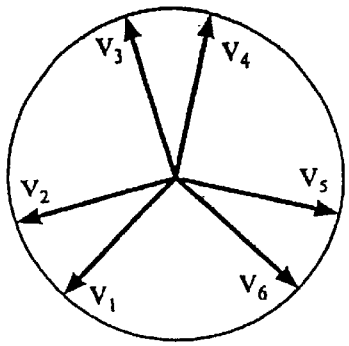
FIG. 31C shows a magnetically balanced state between three vectors in the tertiary harmonic electrical angle plane.

The case of the irregular pitch vernier will now be examined, with reference to FIG. 31B and FIG. 31C. FIG. 31B shows an example of the vector balance between two respective vectors, i.e., $V_1$ and $V_3$, and $V_2$ and $V_4$ It may be possible to balance diagonal vectors $V_1$ and $V_3$, and $V_2$ and $V_4$, symmetric vectors $V_1$ and $V_4$, and $V_2$ and $V_3$, or adjacent vectors $V_1$ and $V_2$, and $V_3$ and $V_4$. These cases in the tertiary harmonic contents can be expressed by Formula 63. A total sum of permeances of the tertiary harmonic contents becomes 0.

$$\sum_{k=1}^{Q} P_k = 0 \tag{63}$$

This means that Formula 64 can be obtained with respect to the angle (machine angle) of a pair of small teeth i and j.

$$\theta_i - \theta_j = \frac{1}{3p}(2m\pi + \pi) \tag{64}$$

Here, m is an integer including 0.

Since $2m\pi$ means the position of the tooth pitch of the small teeth of the rotor, which is not vernier rewriting the above formulas by using a deviation angle $\delta\theta$ from the reference position eventually results in Formulas 65.

$$|\delta\theta_i - \delta\theta_j| = \frac{\pi}{3p} \tag{65}$$

The right side of the Formula 65 has 1.5 degrees (machine angle), and the electrical angle is 180 degrees when a number of pairs p of small teeth of the rotor is 40. By setting right the method for eliminating the tertiary harmonic torque, the following respects can be obtained.

(1) The difference of the deviation angle $\delta\theta$ in the tertiary harmonic content of each small tooth in one pair is set to an electric angle of 180 degrees.

(2) The widths of the respective small teeth are set to be equal.

In the practice, however, it is preferable to make the widths of the respective small teeth identical with each other in order to maintain the symmetry of the iron core.

Test sample of the small teeth arrangement in the tertiary harmonic plane corresponding to Table 5 will be shown in Table 6.

TABLE 6

| Type Small Tooth | Reference Angle | Regular Pitch 2 δ | Regular Pitch 2 Tooth Width | Test Sample 1' δθ | Test Sample 1' Tooth Width | Test Sample 2' δθ | Test Sample 2' Tooth Width | Test Sample 3' δθ | Test Sample 3' Tooth Width | Test Sample 4' δθ | Test Sample 4' Tooth Width |
|---|---|---|---|---|---|---|---|---|---|---|---|
| $t_1$ | -22.5 | +1.25 | 40% | +1.125 | 38% | +0.75 | 35% | +0.75 | 40% | +1.1 | 40% |
| $t_2$ | -13.5 | +0.75 | 40% | +0.75 | 42% | +0.75 | 38% | -0.75 | 40% | +0.9 | 40% |
| $t_3$ | -4.5 | +0.25 | 40% | +0.375 | 38% | +0.75 | 42% | +0.75 | 40% | +0.1 | 40% |
| $t_4$ | +4.5 | -0.25 | 40% | -0.375 | 38% | -0.75 | 42% | -0.75 | 40% | -0.1 | 40% |
| $t_5$ | +13.5 | -0.75 | 40% | -0.75 | 42% | -0.75 | 38% | +0.75 | 40% | -0.9 | 40% |
| $t_6$ | +22.5 | -1.25 | 40% | -1.125 | 38% | -0.75 | 35% | -0.75 | 40% | -1.1 | 40% |
| Balance | | | | | | | | | | | |
| Adjacent Poles | (1.5) | | | | | | | ○ | | Three Poles (0.1) | |
| Diagonal Poles | (1.5) | ○ | | ○ | | | | ○ | | | |
| Symmetric Poles | | | | | | ○ | | ○ | | | |
| Axisymmetry | | ○ | | ○ | | ○ | | ○ | | ○ | |

In the Table 6, a sum of the reference angle and $\delta\theta$ becomes an angle of $\theta_k$ from the center line of the winding pole having the small tooth $t_k$. Further, the regular pitch corresponds to FIG. 29A and the test sample 1' corresponds to FIG. 29B. The test sample 2' corresponds to a case wherein the width of small tooth is different from that of the axisymmetric small tooth, and the test sample 3' corresponds to a case wherein the difference becomes 1.5 degrees in all cases. In case that a number of the small teeth is six, further, the six small teeth are divided into two groups of three small teeth and a valance is achieved in each group, as shown in FIG. 31C. In this case, $V_1$, $V_3$ and $V_5$ make one group and $V_2$, $V_4$ and $V_6$ make the other group. In each group, vectors are balanced with one another by the difference of 120 degrees. The test sample 4' in the Table 6 shows the small teeth arrangement. In this case, three vectors are the same in width and arranged with an interval of 120 degrees with one another. It is possible to take the balance between the three vectors by making the width of one small tooth, such as $V_1$ or $V_6$ large and the distance between remaining two vectors, such as $V_3$ and $V_5$ or $V_4$ and $V_6$ narrow. In either case, the deviation angle in case that the balance is achieved in the third harmonic contents becomes twice of that in case of sixth harmonic contents.

Next, a manner for removing the sixth harmonic contents relating to the cogging torque and the third harmonic contents relating to the current torque at the same time will be examined.

angle) from each other in the third harmonic plane are separated by 240 degrees in the sixth harmonic plane, and two vectors separated by −120 degrees from each other in the third harmonic plane are separated by −240 (120) degrees from each other in the sixth harmonic plane, so that three vectors balanced in the third harmonic plane are balanced automatically in the sixth harmonic plane. Accordingly, the test sample 4' in the Table 6 meets with the condition as shown in Table 7.

TABLE 7

Figure 32:
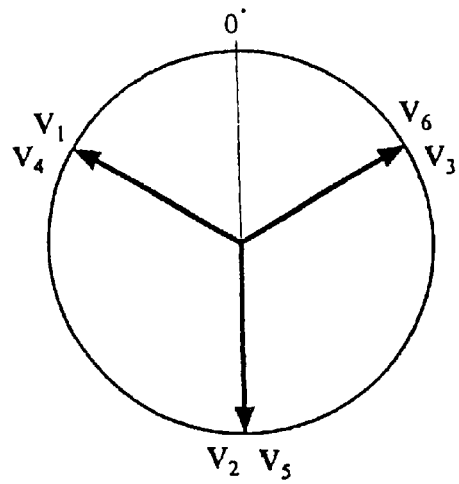
FIG. 32 shows a vector balance in the sixth harmonic plane about a regular pitch vernier.
Figure 34:
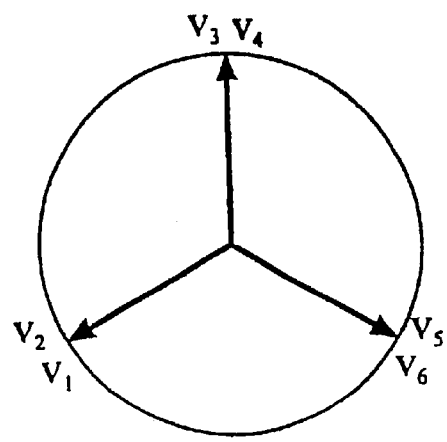
FIG. 34 shows a vector balance in the tertiary harmonic plane of a test sample 5.
Figure 36:
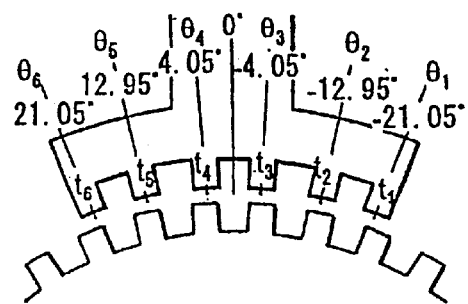
FIG. 36 is an explanation view showing the arrangement of small teeth of the test sample 6.

| Type Small Tooth | Reference Angle | Regular Pitch 2 δ | Tooth Width | Test Sample 4 δθ | Tooth Width | Test Sample 5 δθ | Tooth Width | Test Sample 6 δθ | Tooth Width | Test Sample 7 δθ | Tooth Width |
|---|---|---|---|---|---|---|---|---|---|---|---|
| $t_1$ | −22.5 | +1.25 | 40% | +1.1 | 40% | +1.0 | 40% | +1.45 | 40% | +1.35 | 40% |
| $t_2$ | −13.5 | +0.75 | 40% | +0.9 | 40% | +1.0 | 40% | +0.55 | 40% | +0.75 | 40% |
| $t_3$ | −4.5 | +0.25 | 40% | +0.1 | 40% | 0.0 | 40% | +0.45 | 40% | +0.25 | 40% |
| $t_4$ | +4.5 | −0.25 | 40% | −0.1 | 40% | 0.0 | 40% | −0.45 | 40% | −0.25 | 40% |
| $t_5$ | +13.5 | −0.75 | 40% | −0.9 | 40% | −1.0 | 40% | −0.55 | 40% | −0.75 | 40% |
| $t_6$ | +22.5 | −2.25 | 40% | −1.1 | 40% | −1.0 | 40% | −1.45 | 40% | −1.35 | 40% |
| Third Harmonic Balance | | Two Poles | | Three Poles | | Three Poles | | Three Poles | | Two Poles | |
| Fifth Harmonic Balance | | | | | | | | | | Two Poles | | Three Poles | |
| Sixth Harmonic Balance | | Three Poles | | Three Poles | | Three Poles | | Three Poles | | | |
| Remarks | | FIG. 32 | | | | FIG. 34 | | FIG. 36 | | FIG. 37 | |

As shown in the Table 4, the third and fifth harmonic contents of the permeance relate to the distortion of the current torque, and the sixth harmonic contents relate to the distortion of the cogging torque. The lower order harmonic content is larger than the higher order harmonic content. Accordingly, it is considered that the effect of the third harmonic content is largest.

Accordingly, a manner for eliminating the third and sixth, or the third and fifth harmonic contents at the same time is examined.

It is considered that three groups each having two vectors balanced in the third harmonic plane are to be balanced in the sixth harmonic plane. Two vectors separated by 180 degrees (1.5 degree in machine angle) from each other in the third harmonic plane become two vectors of the same phase identical with each other in the sixth harmonic plane. Three vectors separated by 120 degrees (0.5 degree in machine angle) from one another in the sixth harmonic plane become three vectors separated by 60 degrees in the third harmonic plane.

In consideration of the Table 5 and Table 6 under the above circumstances, the test sample 2' of regular pitch in the Table 6 shows such a relation that the vectors $V_1$ and $V_4$, $V_2$ and $V_5$, and $V_3$ and $V_6$ are separated by 180 degrees from each other, respectively, in the third harmonic plane, vectors $V_1$, $V_2$ and $V_3$, and $V_4$, $V_5$ and $V_6$ are separated by 120 degrees from one another in the sixth harmonic plane. That is, vectors are balanced at the same time in the third and fifth harmonic planes.

The relation of the vectors in FIG. 31A can be expressed by the sixth harmonic plane as shown in FIG. 32. In FIG. 32, two groups each having three vectors are superposed in the sixth harmonic plane.

Figure 33:
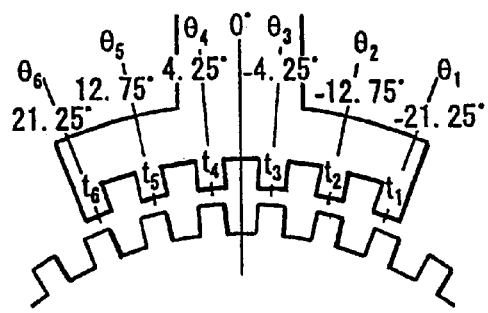
FIG. 33 is an explanation view showing the arrangement of small teeth shown in FIG. 32.

FIG. 33 shows the small teeth arrangement of the above case. In the other aspect, two groups each having three vectors balanced in the third harmonic plane are to be balanced in the sixth harmonic plane. In this manner, two vectors separated by 120 degrees (1.0 degree in machine A test sample 5 in the Table 7 shows a special case wherein three vectors are superposed in the third and sixth harmonic planes. This vector relation is shown in FIG. 34.

Figure 35A:
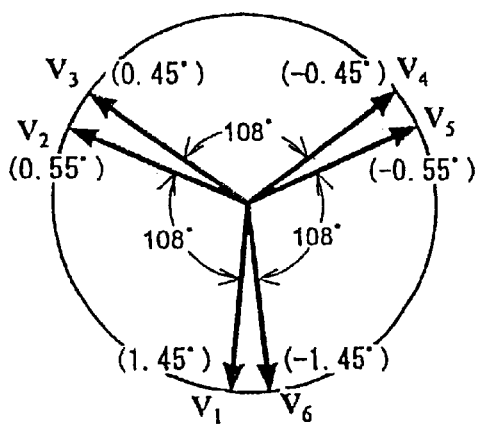
FIG. 35A shows a vector balance state in the tertiary harmonic plane of a test sample 6.
Figure 35B:
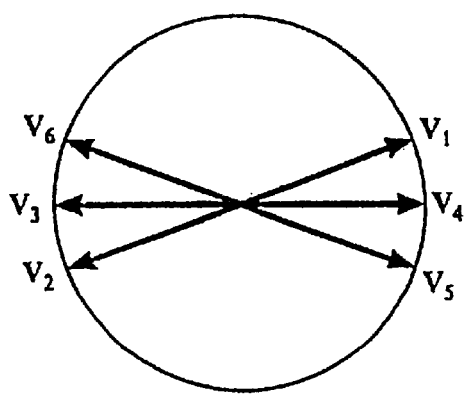
FIG. 35B shows a vector balance in the quaternary harmonic plane of the test sample 6.

Next, the balance in the fifth harmonic plane is examined. It is considered that three vectors balanced in the third harmonic plane are to be balanced in the fifth harmonic plane. In consideration of the fact that the vectors separated by 180 degrees in the fifth harmonic plane are separated by 108 (180×⅗) degrees in the third harmonic plane, vector relations shown in FIG. 35A and FIG. 35B can be obtained. This case corresponds to a test sample 6 in the Table 7 and the balance is achieved automatically also in the sixth harmonic plane, so that the vectors are balanced eventually in the third, fifth and sixth harmonic planes. The small teeth arrangement of this case is shown in FIG. 36.

Figure 37A:
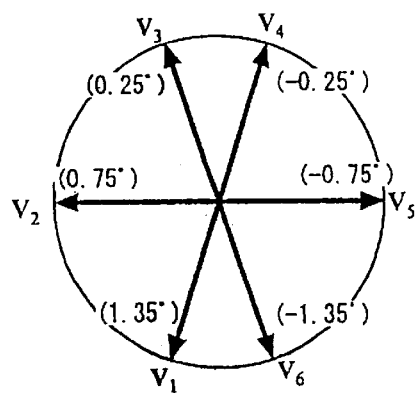
FIG. 37A shows a vector balance in the tertiary harmonic plane of a test sample 7.
Figure 37B:
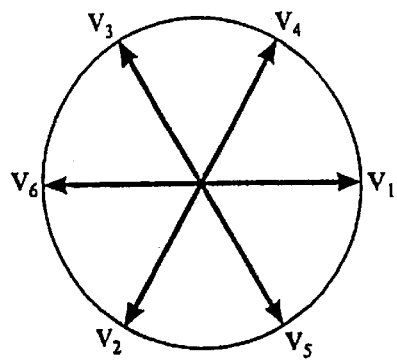
FIG. 37B shows a vector balance in the fifth harmonic plane of the test sample 7.

FIG. 37A and FIG. 37B show a test sample 7 wherein three vectors are balanced in the fifth harmonic plane, and two vectors are balanced in the third harmonic plane. In this case, a balance in the fifth harmonic plane is achieved in each of two groups each having three vectors $V_1$, $V_2$ and $V_3$, or $V_4$, $V_5$ and $V_6$, and a balance in the third harmonic plane is achieved between two vectors $V_1$ and $V_4$, $V_2$ and $V_5$, or $V_3$ and $V_6$, respectively.

Figure 38:
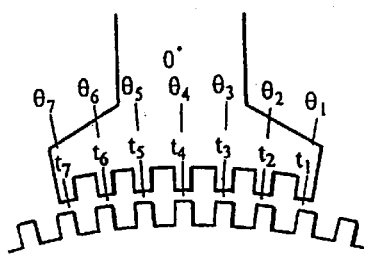
FIG. 38 is an explanation view showing the arrangement of small teeth in case that the number of the small teeth is seven.
Figure 39:
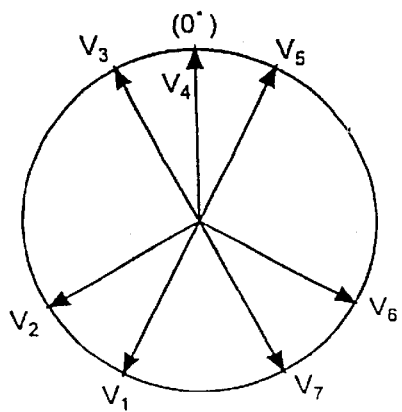
FIG. 39 shows a valanced state of seven vectors.

The table 7 shows the above states. It is considered that the test sample 6 is best because the vectors are balanced in the third, fifth and sixth harmonic planes, however, the value of the fundamental wave is sacrificed a little because the deviation angle becomes largest. Examining the case where a number of small teeth is an odd number, when pairs of small teeth are used to strike a balance in the arrangement of the two small teeth, one fraction is generated in case of the odd number, which produces the inconvenience. Therefore, one small tooth as a fraction must be combined with an arbitrary pair of the small teeth to strike a balance. In case of seven small teeth, as shown in FIG. 38 when two pairs of small teeth and three small teeth are used for balancing, the vector relationship between them is as shown in FIG. 39. Here, a balance is struck between three vectors $V_2$, $V_4$ and $V_6$ and between two pairs of vectors $V_1$ and $V_5$, and $V_3$ and $V_7$, respectively. As shown in FIG. 39, the same vector arrangements appear in the sixth harmonic plane corresponding to the cogging torque and in the third harmonic plane relating to the distortion of the torque waveform. Table 8 shows a relation of the machine angle with respect to the both planes in case that a number of teeth of the rotor is 40. A sum of the reference angle and $\delta\theta$ becomes an angle of $\theta_k$ from the center line of the winding pole of small tooth $t_k$. The tooth width is shown in percent with respect to the rotor small tooth pitch.

The balance angle between two vectors shows a machine angle so that it becomes to 180 degrees in each harmonic plane. The balance angle between three vectors shows a machine angle so that it becomes to 120 degrees in each harmonic plane. It is possible to balance between three vectors even if the tooth width is different. In such a case, the balance angle between the three vectors is different from 120 degrees. It is possible to balance in the harmonic planes of plural orders at the same time, though the detailed explanation thereof is omitted.

A first embodiment of the present invention will be explained with reference to FIGS. 1A to 1C, 11A and 12.

The first embodiment of a three-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at an equal pitch on the inner peripheral surface of the annular stator yoke 1, and stator windings 3 of three-phases each wound around each stator pole 2. Each of said stator poles 2 has four small stator teeth 4 at the tip end thereof. Said rotor 9 has two split rotor elements 7 and a permanent magnet 8 hold therebetween and magnetized so as to form N and S poles in the axial direction thereof. A plurality of small rotor teeth 6 are formed at a regular pitch on the outer peripheral surface of each of said rotor elements 7, said two split rotor elements 7 being shifted from each other in angular position by a ½ pitch of the small rotor teeth 6.

Said small stator teeth 4 are composed of two sets of two small stator teeth 4 of the same width, and at least one pitch of the adjacent teeth 4 is different from the other pitch of the other adjacent teeth 4, so that a vector sum of the tertiary harmonics of permeance of the small stator teeth 4 included in each of said sets becomes substantially zero.

The number of said small stator teeth 4 can be selected as six, eight, ten or twelve instead of four.

A second embodiment of the present invention will be explained with reference to FIGS. 1A to 1C, 13 and 14.

A second embodiment of a three-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of three-phase each wound around each stator pole 2. Each of said stator poles 2 has five small stator teeth 4 at the tip end thereof. Said rotor 9 has two split rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two split rotor elements 7 being shifted from each other in angular position by a ½ pitch of the small rotor teeth 6.

Said small stator teeth 4 are composed of a set of three small stator teeth 4 including a small teeth 4 positioned at the center of the stator pole 2 and a set of two small stator teeth 4, and at least one pitch of the adjacent teeth 4 is different from the other pitch of the other adjacent teeth 4, so that a vector sum of the tertiary harmonics of permeance of the small stator teeth 4 included in each of said sets becomes substantially zero.

A third embodiment of the present invention will be explained with reference to FIGS. 1A to 1C, 15 and 16.

A third embodiment of a three-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of three-phase each wound around each stator pole 2. Each of said stator poles 2 has four small stator teeth 4 at the tip end thereof. Said rotor 9 has two split rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two split rotor elements 7 being shifted from each other in angular position by a ½ pitch of the small rotor teeth 6.

Said small stator teeth 4 are composed of two sets of two small stator teeth 4 of the same width, and at least one pitch of the adjacent teeth is different from the other pitch of the other adjacent teeth, so that a vector sum of the tertiary harmonics of permeance of the small stator teeth 4 included in each of said sets becomes substantially zero, and that a total sum in the fifth harmonics space of a composite vector of permeances between the sets becomes substantially zero.

A fourth embodiment of the present invention will be explained with reference to FIGS. 1A to 1C, and 17 to 19.

A fourth embodiment of a three-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of three-phase each wound around each stator pole 2. Each of said stator poles 2 has five small stator teeth 4 at the tip end thereof. Said rotor 9 has two split rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two split rotor elements 7 being shifted from each other in angular position by a ½ pitch of the small rotor teeth 6.

Said small stator teeth 4 are composed of a first set of three small stator teeth 4 of the same pitch including a small teeth 4 positioned at the center of the stator pole 2 and a second set of two small stator teeth 4 of the same width, and at least one pitch of the adjacent teeth is different from the other pitch of the other adjacent teeth 4, so that a vector sum of the tertiary harmonic of permeances of the small stator teeth 4 included in said first and said second sets becomes substantially zero, and that a total sum in the fifth harmonic space of permeances between said first and second sets becomes substantially zero.

A fifth embodiment of the present invention will be explained with reference to FIGS. 1A to 1C, and 17 to 19.

A fifth embodiment of a three-phase hybrid type stepping motor according to the present invention comprises a stator 5 and a rotor 9 arranged concentrically with the stator 5 and with an air gap therebetween. Said stator 5 has an annular stator yoke 1, a plurality of stator poles 2 extending radially and formed at a regular pitch on the inner peripheral surface of the annular stator yoke 1, and stator windings 3 of three-phase each wound around each stator pole 2. Each of said stator poles 2 has seven small stator teeth 4 at the tip end thereof. Said rotor 9 has two split rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two split rotor elements being shifted from each other in angular position by a ½ pitch of the small rotor teeth 6.

Said small stator teeth 4 are composed of a first set of three small stator teeth 4 of the same width and the same pitch including a small teeth positioned at the center of the stator pole 2 and second set of two small stator teeth 4 of the same width, and at least one pitch of the adjacent teeth is different from the other pitch of the other adjacent teeth, so that a vector sum of the tertiary harmonic of permeances of the small stator teeth included in said first and said second sets becomes substantially zero.

A sixth embodiment of the present invention will be explained with reference to FIGS. 1A to 1C, and 20 to 22.

A sixth embodiment of a three-phase hybrid type stepping motor according to the present invention comprises a stator 5 and a rotor 9 arranged concentrically with the stator 5 and with an air gap therebetween. Said stator 5 has an annular stator yoke 1, a plurality of stator poles 2 extending radially and formed at a regular pitch on the inner peripheral surface of the annular stator yoke 1, and stator windings 3 of three-phase each wound around each stator pole 2. Each of said stator poles 2 has seven small stator teeth 4 at the tip end thereof. Said rotor 9 has two split rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two split rotor elements being shifted from each other in angular position by a ½ pitch of the small rotor teeth 6.

Said small stator teeth 4 are composed of a first set of two small stator teeth 4 of the same with including a small teeth 4 of the different width positioned at the center of the stator pole 2 and second sets of two small stator teeth 4 of the same width, and at least one pitch of the adjacent teeth is different from the other pitch of the other adjacent teeth, so that a vector sum of the tertiary harmonic of permeances of the small stator teeth included in said first and said second sets becomes substantially zero, and that a total sum in the fifth harmonic space of permeances between said first and second sets becomes substantially zero.

Another embodiment of a three-phase hybrid type stepping motor according to the present invention comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles 2 having four small stator teeth 4 at the tip end thereof, said rotor 9 having two split rotor elements 7 and a permanent magnet 8 held therebetween and magnetized so as to form N and S poles in the axial direction thereof, and a plurality of small rotor teeth 6 formed at a regular pitch on the outer peripheral surface of each of said rotor elements 7, said two split rotor elements 7 being shifted from each other in angular position by a ½ pitch of the small rotor teeth.

Said small stator teeth 4 are composed of sets of two small stator teeth 4 of the same width, and at least one pitch of the adjacent teeth 4 is different from the other pitch of the other adjacent teeth, so that a vector sum of the sixth harmonic of permeances of the small stator teeth included in each of said sets becomes substantially zero.

Another embodiment of a three-phase hybrid type stepping motor according to the present invention comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles 2 having four small stator teeth 4 at the tip end thereof, said rotor 9 having two split rotor elements 7 and a permanent magnet 8 held therebetween and magnetized so as to form N and S poles in the axial direction thereof, and a plurality of small rotor teeth 6 formed at a regular pitch on the outer peripheral surface of each of said rotor elements 7, said two split rotor elements 7 being shifted from each other in angular position by a ½ pitch of the small rotor teeth 6.

Said small stator teeth 4 are composed of sets of two small stator teeth 4 of the same width, and at least one pitch of the adjacent teeth 4 is different from the other pitch of the other adjacent teeth, so that a vector sum of the sixth harmonic of permeances of the small stator teeth 4 included in each of said sets becomes substantially zero, and that a total sum in the tertiary harmonic space of a composite vector of permeances between the sets becomes substantially zero.

Another embodiment of a three-phase hybrid type stepping motor according to the present invention comprises a stator 5 and a rotor 7 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles 2 having five small stator teeth 4 at the tip end thereof, said rotor 9 having two split rotor elements 7 and a permanent magnet 8 held therebetween and magnetized so as to form N and S poles in the axial direction thereof, and a plurality of small rotor teeth 6 formed at a regular pitch on the outer peripheral surface of each of said rotor elements 7, said two split rotor elements 7 being shifted from each other in angular position by a ½ pitch of the small rotor teeth 6.

Said small stator teeth 4 are composed of a first set of three small stator teeth 4 of the same pitch including a small teeth 4 positioned at the center of the stator pole and a second set of two small stator teeth 4 of the same width, and at least one pitch of the adjacent teeth is different from the other pitch of the other adjacent teeth, so that a vector sum of the sixth harmonic of permeances of the small stator teeth 4 included in said first and said second sets becomes substantially zero.

Another embodiment of a three-phase hybrid type stepping motor according to the present invention comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles 2 having five small stator teeth 4 at the tip end thereof, said rotor 9 having two split rotor elements 7 and a permanent magnet 8 held therebetween and magnetized so as to form N and S poles in the axial direction thereof, and a plurality of small rotor teeth 6 formed at a regular pitch on the outer peripheral surface of each of said rotor elements 7, said two split rotor elements 7 being shifted from each other in angular position by a ½ pitch of the small rotor teeth 6.

Said small stator teeth 4 are composed of a first set of three small stator teeth 4 of the same pitch including a small teeth positioned at the center of the stator pole and a second set of two small stator teeth 4 of the same width, and at least one pitch of the adjacent teeth is different from the other pitch of the other adjacent teeth, so that a vector sum of the sixth harmonic of permeances of the small stator teeth 4 included in said first and second sets becomes substantially zero, and that a total sum of the tertiary harmonic space of permeances between said first and second sets becomes substantially zero.

Another embodiment of a three-phase hybrid type stepping motor according to the present invention comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles six small stator teeth 4 at the tip end thereof, said rotor 9 having two split rotor elements 7 and a permanent magnet 8 held therebetween and magnetized so as to form N and S poles in-the axial direction thereof, and a plurality of small rotor teeth 6 formed at a regular pitch on the outer peripheral surface of each of said rotor elements 7, said two split rotor elements 9 being shifted from each other in angular position by a ½ pitch of the small rotor teeth 6.

Said small stator teeth are composed of three sets of two small stator teeth 4, and at least one pitch of the adjacent teeth is different from the other pitch of the other adjacent teeth, so that a permeance vector sum on the sixth harmonic plane of permeances of the two small stator teeth 4 included in each of said sets becomes substantially zero.

In a further embodiment of a three-phase hybrid type stepping motor according to the present invention, said small stator teeth 4 are composed of two sets of three small stator teeth 4, and at least one pitch of the adjacent teeth is different from the other pitch of the other adjacent teeth, so that a permeances vector sum on the sixth harmonic plane of permeances of the three small stator teeth 4 included in each of said sets becomes substantially zero.

In a further embodiment of a three-phase hybrid type stepping motor according to the present invention, said small stator teeth 4 are composed of three sets of two small stator teeth, and at least one pitch of the adjacent teeth is different from the other pitch of the other adjacent teeth, so that a permeance vector sum on the tertiary harmonic plane of permeances of the two small stator teeth 4 included in each of said sets becomes substantially zero.

In a further embodiment of a three-phase hybrid type stepping motor according to the present invention, said small stator teeth 4 are composed of at least two sets of three small stator teeth 4, and at least one pitch of the adjacent teeth is different from the other pitch of the other adjacent teeth, so that a permeance vector sum on the tertiary harmonic plane of permeances of the three small stator teeth 4 included in each of said sets becomes substantially zero.

In a further embodiment of a three-phase hybrid type stepping motor according to the present invention, said small stator teeth are composed of two sets of three small stator teeth 4 and at least one pitch of the adjacent teeth is different from the other pitch of the other adjacent teeth, so that a permeance vector sum on the tertiary harmonic plane of permeance of the three small stator teeth included in each of said sets becomes substantially zero, and that a vector sum on the sixth harmonic plane of the small teeth included in each of said sets becomes substantially zero.

In a further embodiment of a three-phase hybrid type stepping motor according to the present invention, said small stator teeth 4 are composed of two sets of three small stator teeth 4 and at least one pitch of the adjacent teeth is different from the other pitch of the other adjacent teeth, so that a permeance vector sum on the sixth harmonic plane of permeances of the three small stator teeth 4 included in each of said sets becomes substantially zero, and that a permeance vector sum on the tertiary harmonic plane of permeances of the small teeth 4 included in each of said sets becomes substantially zero.

In a further embodiment of a three-phase hybrid type stepping motor according to the present invention, said small stator teeth 4 are composed of two sets of three small stator teeth 4 and at least one pitch of the adjacent teeth is different from the other pitch of the other adjacent teeth, so that a permeance vector sum on the tertiary harmonic plane of permeances of the three small stator teeth 4 included in each of said sets becomes substantially zero, and that a permeance vector sum on the fifth harmonic plane of permeances of the two small teeth 4 corresponding to said two sets becomes substantially zero.

In a further embodiment of a three-phase hybrid type stepping motor according to the present invention, said small stator teeth are composed of two sets of three small stator teeth 4, and at least one pitch of the adjacent teeth is different from the other pitch of the other adjacent teeth, so that a permeance vector sum on the fifth harmonic plane of permeances of the three small stator teeth 4 included in each of said sets becomes substantially zero, and that a permeance vector sum on the tertiary harmonic plane of permeances of the two small teeth 4 corresponding to said two sets becomes substantially zero.

A still further embodiment of a three-phase hybrid type stepping motor comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles 2 having seven small stator teeth 4 at the tip end thereof, said rotor 9 having two split rotor elements 7 and a permanent magnet 8 held therebetween and magnetized so as to form N and S poles in the axial direction thereof, and a plurality of small rotor teeth 6 formed at a regular pitch on the outer peripheral surface of each of said rotor elements 7, said two split rotor elements 7 being shifted from each other in angular position by a ½ pitch of the small rotor teeth 6.

Said small stator teeth 4 are composed of a set of three small stator teeth 4 and two sets of two small stator teeth, and at least one pitch of the adjacent teeth is different from the other pitch of the other adjacent teeth, so that a permeance vector sum on the sixth harmonic plane of permeances of the small teeth included in each of said sets becomes substantially zero.

Other embodiment of a three-phase hybrid type stepping motor comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, and stator windings 3 of three-phase each wound around each stator pole 2, each of said stator poles 2 having seven small stator teeth 4 at the tip end thereof, said rotor 9 having two split rotor elements 7 and a permanent magnet 8 held therebetween and magnetized so as to form N and S poles in the axial direction thereof, and a plurality of small rotor teeth 6 formed at a regular pitch on the outer peripheral surface of each of said rotor elements 7, said two split rotor elements 7 being shifted from each other in angular position by a ½ pitch of the small rotor teeth 6.

Said small stator teeth 4 are composed of a set of three small teeth 4 and two sets of two small stator teeth 4, and at least one pitch of the adjacent teeth is different from the other pitch of the other adjacent teeth, so that a permeance vector sum on the tertiary harmonic plane of permeances of the small stator teeth 4 included in each of said sets becomes substantially zero.

According to the present invention of the three-phase hybrid type stepping motor, the small stator teeth formed on the tip end of the winding pole are so arranged that the vectors on the third, fifth and/or sixth harmonic planes are balanced by the set of two or three small stator teeth, and that the third harmonic distortions of the cogging torque and the current torque can be reduced.

While the invention has been particularly shown and described with reference to the preferred embodiments thereof, it will be understood by those skilled in the art that various changes in form and details may be made therein without departing from the spirit and scope of the invention defined by the appended claims.

What is claimed is:

1. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of-said stator poles having an even number of and at least four small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of sets of two small stator teeth of the same width, and at least one pitch of adjacent teeth is different from another pitch of other adjacent teeth, so that a vector sum of the tertiary harmonic of permeances of the small stator teeth included in each of said sets becomes substantially zero.

2. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an odd number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a first set of three small stator teeth including a small tooth positioned at the center of the stator pole and a second set of two small stator teeth of the same width, and at least one pitch of adjacent teeth is different from another pitch of other adjacent teeth, so that a vector sum of the tertiary harmonic of permeances of the small stator teeth included in said first and said second sets becomes substantially zero.

3. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an even number of and at least four small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of sets of two small stator teeth of the same width, and at least one pitch of adjacent teeth is different from another pitch of other adjacent teeth, so that a vector sum of the tertiary harmonic of permeances of the small stator teeth included in each of said sets becomes substantially zero, and so that a total sum in the fifth harmonic space of a composite vector of permeances of the small stator teeth included in each of said sets becomes substantially zero.

4. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an odd number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a first set of three small stator teeth of the same pitch including a small tooth positioned at the center of the stator pole and a second set of two small stator teeth of the same width, and at least one pitch of adjacent teeth is different from another pitch of other adjacent teeth, so that a vector sum of the tertiary harmonic of permeances of the small stator teeth included in said first and said second sets becomes substantially zero, and so that a total sum in the fifth harmonic space of permeances of the small stator teeth included in each of said first and second sets becomes substantially zero.

5. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a first set of three small stator teeth of the same width and the same pitch including a small tooth positioned at the center of the stator pole and second sets of two small stator teeth of the same width, and at least one pitch of adjacent teeth is different from another pitch of other adjacent teeth, so that a vector sum of the tertiary harmonic of permeances of the small stator teeth included in said first and said second sets becomes substantially zero.

6. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a first set of three small stator teeth of the same width including a small tooth of the different width positioned at the center of the stator pole and second sets of two small stator teeth of the same width, and at least one pitch of adjacent teeth is different from another pitch of other adjacent teeth, so that a vector sum of the tertiary harmonic of permeances of the small stator teeth included in said first and said second sets becomes substantially zero, and so that a total sum in the fifth harmonic space of permeances of the small stator teeth included in each of said first and second sets becomes substantially zero.

7. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an even number of and at least four small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of sets of two small stator teeth of the same width, and at least one pitch of adjacent teeth is different from another pitch of other adjacent teeth, so that a vector sum of the sixth harmonic of permeances of the small stator teeth included in each of said sets becomes substantially zero.

8. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an even number of and at least four small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of sets of two small stator teeth of the same width, and at least one pitch of adjacent teeth is different from another pitch of other adjacent teeth, so that a vector sum of the sixth harmonic of permeances of the small stator teeth included in each of said sets becomes substantially zero, and so that a vector sum of the tertiary harmonics of permeances of the small stator teeth included in each of the sets becomes substantially zero.

9. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an even number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a first set of three small stator teeth of the same pitch including a small tooth positioned at the center of the stator pole and a second set of two small stator teeth of the same width, and at least one pitch of adjacent teeth is different from another pitch of other adjacent teeth, so that a vector sum of the sixth harmonic of permeances of the small stator teeth included in said first and said second sets becomes substantially zero.

10. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an even number of and at least five small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a first set of three small stator teeth of the same pitch including a small tooth positioned at the center of the stator pole and a second set of two small stator teeth of the same width, and at least one pitch of adjacent teeth is different from another pitch of other adjacent teeth, so that a vector sum of the sixth harmonic of permeances of the small stator teeth included in said first and second sets becomes substantially zero, and so that a vector sum of the tertiary harmonic of permeances of the small stator teeth included in each of said first and second sets becomes substantially zero.

11. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least three sets of two small stator teeth, and at least one pitch of adjacent teeth is different from another pitch of other adjacent teeth, so that a vector sum of the sixth harmonic plane of permeances of the two small stator teeth included in each of said sets becomes substantially zero.

12. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least two sets of three small stator teeth, and at least one pitch of adjacent teeth is different from another pitch of other adjacent teeth, so that a vector sum of the sixth harmonic plane of permeances of the three small stator teeth included in each of said sets becomes substantially zero.

13. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least three sets of two small stator teeth, and at least one pitch of adjacent teeth is different from another pitch of other adjacent teeth, so that a vector sum of the tertiary harmonic plane of permeances of the two small stator teeth included in each of said sets becomes substantially zero.

14. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least two sets of three small stator teeth, and at least one pitch of adjacent teeth is different from another pitch of other adjacent teeth, so that a vector sum of the tertiary harmonic plane of permeances of the three small stator teeth included in each of said sets becomes substantially zero.

15. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least two sets of three small stator teeth and at least one pitch of adjacent teeth is different from another pitch of other adjacent teeth, so that a permeance vector sum on the tertiary harmonic plane of permeance of the three small stator teeth included in each of said sets becomes substantially zero, and so that a vector sum of the sixth harmonic plane of the small teeth included in each of said sets becomes substantially zero.

16. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least two sets of three small stator teeth and at least one pitch of adjacent teeth is different from another pitch of other adjacent teeth, so that a permeance vector sum on the sixth harmonic plane of permeances of the three small stator teeth included in each of said sets becomes substantially zero, and so that a vector sum of the tertiary harmonic plane of permeances of the small teeth included in each of said sets becomes substantially zero.

17. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a multiple number of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of at least two sets of three small stator teeth and at least one pitch of adjacent teeth is different from another pitch of other adjacent teeth, so that a vector sum of the tertiary harmonic plane of permeances of the three small stator teeth included in each of said sets becomes substantially zero, and so that a permeance vector sum on the fifth harmonic plane of permeances of the two small teeth corresponding to said two sets becomes substantially zero.

18. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having a plurality of and at least six small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of two sets of three small stator teeth, and at least one pitch of adjacent teeth is different from another pitch of other adjacent teeth, so that a permeance vector sum on the fifth harmonic plane of permeances of the three small stator teeth included in each of said sets becomes substantially zero, and so that a vector sum of the tertiary harmonic plane of permeances of the two small teeth corresponding to said two sets becomes substantially zero.

19. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a set of three small stator teeth and two sets of two small stator teeth, and at least one pitch of adjacent teeth is different from another pitch of other adjacent teeth, so that a vector sum of the sixth harmonic plane of permeances of the small teeth included in each of said sets becomes substantially zero.

20. A three-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and three phase stator windings each wound around each stator pole, each of said stator poles having an odd number of and at least seven small stator teeth at the tip end thereof, said rotor having two split rotor elements and a permanent magnet held therebetween and magnetized so as to form N and S poles in the axial direction thereof, and a plurality of small rotor teeth formed at a regular pitch on the outer peripheral surface of each of said rotor elements, said two split rotor elements being shifted from each other in angular position by ½ the pitch of the small rotor teeth, wherein said small stator teeth are composed of a set of three small teeth and two sets of two small stator teeth, and at least one pitch of adjacent teeth is different from another pitch of other adjacent teeth, so that a vector sum of the tertiary harmonic plane of permeances of the small stator teeth included in each of said sets becomes substantially zero.

* * * * *